United States Patent
Alcaraz et al.

(10) Patent No.: US 12,162,988 B2
(45) Date of Patent: Dec. 10, 2024

(54) POLYAMINOBORANES

(71) Applicants: CENTRE NATIONAL DE LA RECHERCHE SCIENTIFIQUE—CNRS, Paris (FR); Université de Rennes 1, Rennes (FR)

(72) Inventors: Gilles Alcaraz, Rennes (FR); Carlos Antonio De Albuquerque Pinheiro, Vielha (ES); Claire Roiland, Rennes (FR)

(73) Assignees: CENTRE NATIONAL DE LA RECHERCHE SCIENTIFIQUE—CNRS, Paris (FR); UNIVERSITE DE RENNES, Rennes (FR)

( * ) Notice: Subject to any disclaimer, the term of this patent is extended or adjusted under 35 U.S.C. 154(b) by 710 days.

(21) Appl. No.: 17/374,354

(22) Filed: Jul. 13, 2021

(65) Prior Publication Data

US 2021/0340331 A1    Nov. 4, 2021

Related U.S. Application Data

(62) Division of application No. 16/481,749, filed as application No. PCT/EP2018/052312 on Jan. 30, 2018, now Pat. No. 11,091,593.

(30) Foreign Application Priority Data

Jan. 30, 2017 (FR) ...................................... 1750723

(51) Int. Cl.
C08G 79/08 (2006.01)
C04B 35/583 (2006.01)

(52) U.S. Cl.
CPC ............ C08G 79/08 (2013.01); C04B 35/583 (2013.01)

(58) Field of Classification Search
CPC ........ C08G 79/08; C08G 77/26; C04B 35/583
See application file for complete search history.

(56) References Cited

U.S. PATENT DOCUMENTS

| | | | |
|---|---|---|---|
| 3,047,623 A | 7/1962 | Milks | |
| 5,015,607 A | 5/1991 | Ardaud et al. | |
| 5,071,935 A * | 12/1991 | Ardaud ................. | C08G 79/08 528/7 |
| 7,179,940 B2 | 2/2007 | Vaultier et al. | |
| 2005/0107633 A1 * | 5/2005 | Vaultier ................... | C07F 5/02 564/9 |

FOREIGN PATENT DOCUMENTS

GB        881820 A    11/1961

OTHER PUBLICATIONS

Pusatcioglu et al.(Thermal Stability and Molecular Weight of Two New Boron-Nitrogen Polymers, Journal of Applied Polymer Science, vol. 21, 1561-1567 (1977), published on Sep. 1977).*
III. Staubitz et al.(Iridium-Catalyzed Dehydrocoupling of Primary Amine-Borane Adducts: A Route to High Molecular Weight Polyaminoboranes, Boron-Nitrogen Analogues of Polyolefins, Angew. Chem. 2008, 120, 6308-6311, published on Aug. 2008).*
Staubitz et al. "Iridium-Catalyzed Dehydrocoupling of Primary Amine-Borane Adducts: A Route to High Molecular Weight Polyaminoboranes, Boron-Nitrogen Analogues of Polyolefins" angew. chem. int. ed. 2008, 47, 6212-6215 (4 bages).
Staubitz et al. "Catalytic Dehydrocoupling/Dehydrogenation of N-Methylamine-Borane and Ammonia-Borane: Synthesis and Characterization of High Molecular Weight Polyaminoboranes" J. Am. Chem. Soc. 2010, 132, 13332-13345 (14 pages).
Dietrich et al. "Iridium-Catalyzed Dehydrogenation of Substituted Amine Boranes:Kinetics, Thermodynamics, and Implications for Hydrogen Storage" Inorganic Chemistry, vol. 47, No. 19, 2008 (3 pages).
Stubbs et al. "Amineeborane dehydrogenation chemistry: Metal-free hydrogen transfer, new catalysts and mechanisms, and the synthesis of polyaminoboranes" Journal of Organometallic Chemistry 730 (2013) 84-89 (6 pages).
Burg et al. "The N-Methyl Derivatives of B2H7N1" Journal of the American Chemical Society, vol. 71, No. 10; Oct. 1, 1949 (5 pages).
International Search Report issued in International Application No. PCT/EP2018/052312, mailed Mar. 26, 2018 (7 pages).
Written Opinion issued in International Application No. PCT/EP2018/052312; Dated Mar. 26, 2018 (9 pages).
International Preliminary Report on Patentability issued in International Application No. PCT/EP2018/052312; mailed Jul. 30, 2019 (6 pages).
H. C. Johnson et al., "Mechanistic Studies of the Dehydrocoupling and Dehydropolymerization of Amine-Boranes Using a [Rh (Xantphos)] Catalyst," 136 J. Am. Chem. Soc. 9078 (2014) (16 pages).
A. Kumar et al., "The Simplest Amino-borane H2B=N H2 Trapped on a Rhodium Dimer: Pre-Catalysts for Amine-Borane Dehydropolymerization," 55 Angew. Chem. Int. Ed. 6651 (2016) (6 pages).
W. C. Ewing, Patrick J. Carroll & Larry G. Sneddon, "Syntheses and Characterization of Linear Triborazanes," 52 Inorganic Chemistry 10,690 (2013) (8 pages).

* cited by examiner

*Primary Examiner* — Gregory Listvoyb
(74) *Attorney, Agent, or Firm* — Osha Bergman Watanabe & Burton LLP

(57) ABSTRACT

A process for preparing a polyaminoborane comprising reacting at least one monomer with an aminoborane, wherein the at least one monomer is selected from the group consisting of ammonia, a primary amine and a substituted or unsubstituted hydrazine; and wherein the aminoborane comprises a borane substituted by a secondary amino group; polyaminoboranes obtainable by said process; use of said polyaminoboranes for the preparation of a ceramic precursor or a ceramic, the production of boron nitride, or the storage and/or production of dihydrogen; ceramic precursors, ceramics, hydrogen cells or energy materials comprising said polyaminoboranes.

6 Claims, 7 Drawing Sheets

POLYAMINOBORANES

The present application is a divisional application of U.S. application Ser. No. 16/481,749, filed on Jul. 29, 2019, which is a U.S. national stage entry under 35 U.S.C. § 371 of International Application No. PCT/EP2018/052312 filed on Jan. 30, 2018, which claims priority to French Application No. 1750723 filed on Jan. 30, 2017.

TECHNICAL FIELD

This description concerns polyaminoboranes; their preparation process; their use for the preparation of a ceramic precursor or a ceramic, for the production of boron nitride, for the storage and/or production of dihydrogen; as well as ceramic precursors, ceramics, hydrogen cells and energy materials comprising said polyaminoboranes.

STATE OF THE ART

Polyaminoboranes, compounds of the formula [RR'N—BR"R'"]$_x$, are compounds that can be used as ceramic precursors, such as boron-based ceramics. As polyaminoboranes are capable of producing, for example thermally, dihydrogen, these compounds can also be used for storage and production of dihydrogen.

It is known that a polyaminoborane, such as [NH$_2$—BH$_2$]$_x$, can be prepared by a process comprising a loss of dihydrogen from an amine borane, such as borazane (NH$_3$—BH$_3$), the loss of dihydrogen typically occurring by thermal means. However, the dehydrogenation of an amine-borane by thermal means is poorly controlled and only allows the production of dimers and trimers, as well as occasionally some oligomers. It should be noted, for example, that the thermal decomposition of amine-boranes typically leads to the formation of the corresponding trimer which is a cyclotriborazane of formula [RR'NH—BHR"R'"]$_3$, of which typically only metallo-catalyzed dehydrogenation using a specific catalyst allows the corresponding linear polymers to be obtained.

It is known that the formation of a long-chain polyaminoborane by dehydrogenation of an amine-borane can also be carried out by organometallic catalysis using a transition metal complex, for example iridium or ruthenium-based.

For example, A Staubitz et al. ("*Iridium-Catalyzed Dehydrocoupling of Primary Amine-Borane Adducts: A Route to High Molecular Weight Polyaminoboranes, Boron-Nitrogen Analogues of Polyolefins*", Angew. Chem. Int. Ed., 2008, 47, 6212-6215) describe in particular a dehydrogenation polymerization reaction of N-methylborazane (MeNH$_2$—BH$_3$) and/or N-nbutylborazane (nBuNH$_2$—BH$_3$) using a catalyst in tetrahydrofurane to produce corresponding polymers or copolymers, i.e., [MeNH—BH$_2$]$_x$, [nBuNH—BH$_2$]$_x$ and [MeNH—BH$_2$]$_x$[nBuNH—BH$_2$]$_y$.

A Staubitz et al. ("*Catalytic Dehydrocoupling/Dehydrogenation of N-Methylamine-Borane and Ammonia-Borane: Synthesis and Characterization of High Molecular Weight Polyaminoboranes*", J. Am. Chem. Soc., 2010, 132, 13332-13345) also describe a dehydrogenation polymerization reaction of borazane or N-methylborazane using a catalyst to produce corresponding polymers, i.e. [NH$_2$—BH$_2$]$_x$, and [MeNH—BH$_2$]$_x$.

B. L. Dietrich et al. ("*Iridium-Catalyzed Dehydrogenation of Substituted Amine Boranes: Kinetics, Thermodynamics, and Implications for Hydrogen Storage*", Inorganic Chemistry, 2008, 47, 19, 8583-8585) describe a polymerization reaction by dehydrogenation of borazane and/or N-methylborazane using a catalyst to produce corresponding oligomers or co-oligomers, i.e. [NH$_2$—BH$_2$]$_x$, [MeNH—BH$_2$]$_x$ and [NH$_2$—BH$_2$]$_x$[MeNH—BH$_2$]$_y$.

N. E. Subbs et al. ("*Amine-borane dehydrogenation chemistry: Metal free hydrogen transfer, new catalysts and mechanisms, and the synthesis of polyaminoboranes*", Journal of Organometallic Chemistry, 2013, 730, 84-89) describe a catalytic hydrogenation reaction of NN-diisopropylaminoborane (iPr$_2$N=BH$_2$) using N-methylborazane to produce diisopropylamine-borane (i.e. NN-diisopropylborazane; iPr$_2$NH—BH$_3$) and polyaminoborane [MeNH—BH$_2$]$_x$ in dimeric, oligomeric or polymeric form.

However, the known processes only provide a limited range of polyaminoboranes. Indeed, only polyaminoboranes of formula [NH$_2$—BH$_2$]$_x$, [MeNH—BH$_2$]$_x$, [nBuNH—BH$_2$]$_x$, and [MeNH—BH$_2$]$_x$[nBuNH—BH$_2$]$_y$ are listed. In addition, the known processes require the formation of one equivalent of dihydrogen during the formation of the polyaminoborane. The known processes also require the use of a solvent as well as the use of thermal activation and/or an organometallic catalyst. Thus, these processes are expensive, require special conditions and cannot be generalized, which makes them unattractive. As polyaminoboranes are generally produced by metallo-catalyzed dehydrogenation from corresponding amine-boranes, an additional limitation related to the processes defined above is the synthesis of the amine-boranes themselves, which are typically difficult to prepare and isolate.

Consequently, there is a need to provide polyaminoboranes and their preparation process allowing to overcome the above-mentioned limitations.

SUMMARY

The first purpose of the present description is to provide a simple and unique process for the preparation of polyaminoboranes. On the one hand, the process of the present description allows the generation of dihydrogen during the preparation of polyaminoboranes to be avoided. On the other hand, the process of the present description does not require the use of a catalyst or solvent to form polyaminoboranes.

The second purpose of the present description is to provide a large family of polyaminoboranes. Indeed, the process of the present description allows the use of a wide range of substrates, including functional amines, thus providing access to functionalized polyaminoboranes.

According to a first aspect, the above-mentioned objects, as well as other advantages, are obtained by a process for preparing a polyaminoborane comprising reacting at least one monomer with an aminoborane, wherein the at least one monomer is selected from the group consisting of ammonia, a primary amine and a substituted or unsubstituted hydrazine; and wherein the aminoborane comprises a borane substituted by a secondary amino group.

According to a second aspect, the above-mentioned objects, as well as other advantages, are obtained by a polyaminoborane comprising at least one repeating unit having the formula R$^5$NH—BR$^3$R$^4$, wherein R$^3$ and R$^4$ are the same or different and are selected from the group consisting of a hydrogen atom, a substituted or unsubstituted heteroatom and a linear, branched, cyclic or cyclic and branched organic group having from 1 to 30 carbon atoms; or R$^3$ and R$^4$ together form a cyclic or cyclic and branched organic group having from 3 to 30 carbon atoms; wherein R$^5$ is selected from the group consisting of a hydrogen atom, a substituted or unsubstituted nitrogen atom and a linear, branched, cyclic or cyclic and branched organic group having from 1 to 30 carbon atoms; wherein, if $R^5$ is a hydrogen atom or a methyl atom, at least one of $R^3$ and $R^4$ is not a hydrogen atom; and wherein, if $R^5$ is an n-butyl group, at least one of $R^3$ and $R^4$ is not a hydrogen atom or the polyaminoborane has a weight average molecular weight of about 500,000 or more.

According to a third aspect, the above-mentioned objects, as well as other advantages, are obtained by using a polyaminoborane according to the second aspect for the preparation of a ceramic precursor or a ceramic.

According to a fourth aspect, the above-mentioned objects, as well as other advantages, are obtained by using a polyaminoborane according to the second aspect for the production of boron nitride.

According to a fifth aspect, the above-mentioned objects, as well as other advantages, are obtained by using a polyaminoborane according to the second aspect for the storage and/or production of dihydrogen.

According to a sixth aspect, the above-mentioned objects, as well as other advantages, are obtained by a ceramic or ceramic precursor comprising a polyaminoborane according to the second aspect.

According to a seventh aspect, the above-mentioned objects, as well as other advantages, are obtained by a hydrogen fuel cell or an energy material comprising a polyaminoborane according to the second aspect.

Embodiments according to the aspects referred to above as well as additional advantages will appear when reading the description illustrated by the following Figures and the appended claims.

DETAILED DESCRIPTION

Figure 1:
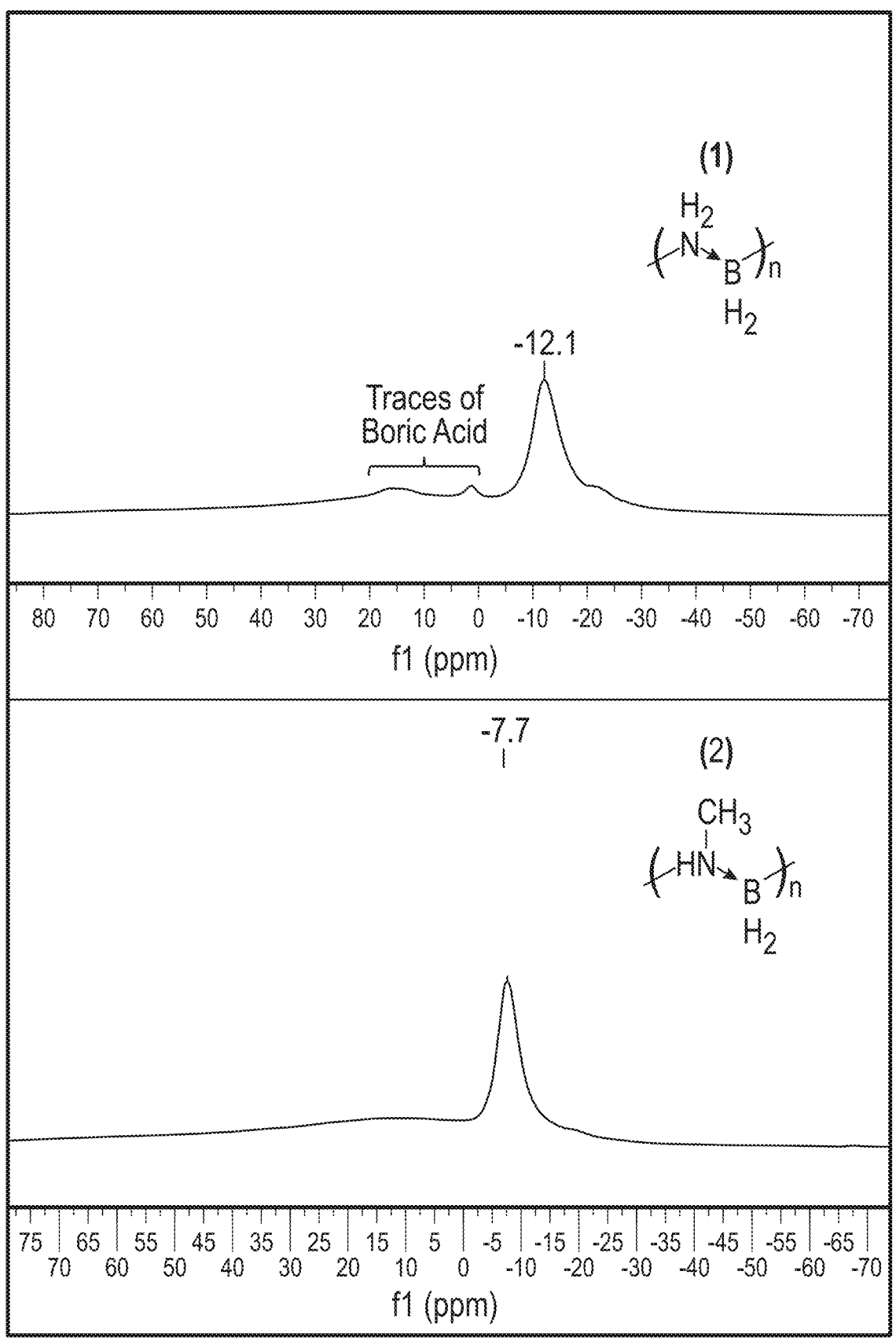
FIG. 1 shows a diagram illustrating NMR spectra representative of the solid $^{11}B\{^1H\}$ of polyaminoboranes according to embodiments of the present description.

Embodiments of the present description will now be described in detail. In the following detailed description of the embodiments of this invention, many specific details are set out in order to provide a more detailed understanding of the present description. However, it will appear to the skilled person that the present description can be implemented without these specific details. In other cases, well-known characteristics have not been described in detail to avoid complicating the description unnecessarily.

In the following, the term "to comprise" is synonymous with (means the same as) "to include" and "to contain", and is inclusive or open and does not exclude other undisclosed elements. In addition, in the present description, the terms "about", "substantially" and "approximately" are synonymous with (means the same as) a lower and/or higher margin of 10% of the respective value.

In the following, the term "organic" is synonymous with (means the same as) a hydrocarbon compound, i.e. a compound comprising one or more carbon and hydrogen atoms.

In the following, the term "ammonia" is synonymous with (means the same as) a compound of formula $NH_3$. In the following, the term "amine" is synonymous with (means the same as) an ammonia derivative wherein at least one hydrogen atom is replaced by a carbon group. In the following, the term "primary amine" is synonymous with (means the same as) an amine wherein only one hydrogen atom is replaced by a hydrocarbon group. In the following, the term "secondary amino" is synonymous with (means the same as) a radical of formula $NR^1R^2$ wherein both $R^1$ and $R^2$ are a hydrocarbon group.

In the following, the term "hydrazine" is synonymous with (means the same as) a chemical compound of formula $NH_2NH_2$ and derivatives wherein one or more hydrogen atoms are replaced by a hydrocarbon group.

In the following, the terms "amine-borane", "amine-borane adduct" and "borazane" are synonymous with (means the same as) a chemical compound of formula $NR_3BR_3$ wherein R is a hydrogen atom or a hydrocarbon group, such as for example $NH_3BH_3$, $MeNH_2BH_3$ and $nBuNH_2BH_3$, wherein the borane is bound to the amine, for example by a highly-contributing covalent bond. An amine-borane can also be described schematically according to the following mesomers:

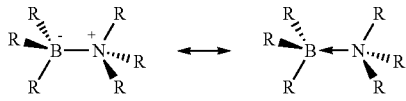

It is thus apparent that ammonia, a primary amine and a hydrazine are distinct compounds from an amine-borane.

In the following, the term "unsubstituted" is synonymous with (means the same as) non substituted by an atom other than one or several hydrogen atoms.

In the following, the term "substituted" is synonymous with (means the same as) substituted by at least one element other than a hydrogen atom, for example substituted by at least one hydrocarbon substituent, such as $R^a$, $R^b$, $R^c$ and $R^d$. According to one or more embodiments, the element is chosen from the group consisting of alkyl, alkenyl, alkynyl, aryl, heteroaryl, alkylalkenyl, alkenylalkyl, alkylalkynyl, alkynylalkyl, alkylaryl, arylalkyl, alkylheteroaryl, a heteroarylalkenyl, alkenylaryl, alkenylheteroaryl, arylalkynyl, heteroarylalkynyl, alkynylaryl and alkynylheteroaryl, the element comprising from 1 to 20 carbon atoms, such as from 2 to 18, 3 to 16, 4 to 14 or 5 to 12 carbon atoms; which element optionally comprising one or more heteroatoms, such as for example N, O, S, P, Si, Sn, Ge, As, F, Cl, Br and I; and/or which element optionally comprising one or more functional groups selected from the list consisting of alkyl, alkene, alkyne, aryl, heteroaryl, alcohol, ketone, benzoyl, aldehyde, carbonate, carboxylic acid, carboxylate, ester, ether oxide, heterocycle, amine, amide, azo, diazo, diazoamino, azide, secondary imine, hydrazine, hydrazone, amidine, carbamate, guanidine, carbodiimide, nitrile, isonitrile, imide, azide, diimide, thiol, thioether, thioketone, cyanate, nitrate, nitrite, nitro, nitroso, oxime, pyridyl, thioether, disulfide, sulfinyl, sulfonyl, thiocyanate, isothiocyanate, thione, phosphorane, phosphine, boronate, borinate, silane and halogen groups, the functional groups comprising from 0 to 20 carbon atoms, such as from 1 to 20, 2 to 18, 3 to 16, 4 to 14 or 5 to 12 carbon atoms.

In the following, functional groups containing an aryl group preferably include at least 5 carbon atoms, such as 6 to 20 carbon atoms. In the following, functional groups containing an alkenyl or alkynyl group include at least 2 carbon atoms, such as 3 to 20 carbon atoms. In the following, functional groups with a branched group include at least 3 carbon atoms, such as 4 to 20 carbon atoms. In the following, functional groups with a cyclic group preferably include at least 3 carbon atoms, such as 4 to 20 or 5 to 20 carbon atoms. In the following, functional groups with a branched cyclic group preferably include at least 4 carbon atoms, such as 5 to 20 or 6 to 20 carbon atoms.

The present description refers to a process for the preparation of polyaminoboranes comprising reacting at least one monomer with an aminoborane. More precisely, according to the first aspect, the at least one monomer is selected from the group consisting of ammonia, a primary amine and a substituted or unsubstituted hydrazine, the aminoborane comprising a borane substituted by a secondary amino group.

The process according to the present description allows the production of a wide range of polyaminoboranes, which can be prepared by means of a simple and unique step, without generating dihydrogen, without the need to use a solvent, a catalyst and/or thermal activation. Indeed, the process according to the present description is an easy process to implement, with no release of dihydrogen, which is a clear advantage from a safety point of view. In addition, the process as described herein does not require the use of any solvent that may become a contaminant at the end of the process. Also, the process as described herein does not require the use of a catalyst, for example a catalyst based on an expensive precious metal, which is difficult to prepare, may be sensitive to air and/or oxygen and may become a contaminant of the polyaminoboranes. The resulting polyaminoborane is also easy to isolate and purify and the process can be carried out with a large number of primary amines and hydrazines, including functional amines/hydrazines without affecting the outcome of the reaction, unlike metallo-catalyzed methods. The process as described herein represents a clear additional advantage in that it allows a simple monomer, such as a primary amine, to be used directly, for example alone, without solvent, without catalyst and/or without requiring the formation of an adduct comprising the monomer before the reaction with the aminoborane.

According to one or more embodiments of the process, polyaminoborane is in polymeric and/or oligomeric form. The polymers obtained can be of much higher mass than polymers obtained by metallo-catalyzed approaches. Yields may also be higher than those of metallo-catalyzed approaches. It is also possible to obtain polyaminoboranes in oligomeric form.

According to one or more embodiments of the process, polyaminoborane is a copolymer and/or a co-oligomer. The process can also be carried out from mixtures of ammonia, primary amines and/or hydrazines to form copolymers, such as statistical polymers.

According to one or more embodiments:

A/ the aminoborane responds to (e.g. comprises or consists of) the formula $R^1R^2N-BR^3R^4$, wherein $R^1$ and $R^2$ are the same or different, linear, branched, cyclic or cyclic and branched organic groups having from 2 to 30 carbon atoms, such as from 3 to 24, 4 to 20 or 5 to 16 carbon atoms; or $R^1$ and $R^2$ together form a cyclic or cyclic and branched organic group having from 2 to 30 carbon atoms, such as from 3 to 24, 4 to 20 or 5 to 16 carbon atoms; wherein $R^3$ and $R^4$ are the same or different and selected from the group consisting of a hydrogen atom, a substituted or unsubstituted heteroatom and a linear, branched, cyclic or cyclic and branched organic group having 1 to 30 carbon atoms, such as 2 to 28, 3 to 24, 4 to 20 or 5 to 16 carbon atoms; or $R^3$ and $R^4$ together form a cyclic or cyclic and branched organic group having 3 to 30 carbon atoms, such as 4 to 20 or 5 to 16 carbon atoms; and/or B/ the monomer has the formula $R^5NH_2$, wherein $R^5$ is selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; and/or C/ a first monomer has the formula $R^5NH_2$ and a second monomer has the formula $R^6NH_2$, wherein $R^5$ and $R^6$ are different and selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; and/or D/ the polyaminoborane comprises at least one repeating unit of formula $R^5NH-BR^3R^4$, wherein $R^3$ and $R^4$ are identical or different and are selected from the group consisting of a hydrogen atom, a substituted or unsubstituted heteroatom and a linear, branched, cyclic or cyclic and branched organic group having from 1 to 30 carbon atoms, such as from 2 to 28, 3 to 24, 4 to 20 or 5 to 16 carbon atoms; or $R^3$ and $R^4$ together form a cyclic or cyclic and branched organic group having from 3 to 30 carbon atoms, such as from 4 to 20 or 5 to 16 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; and/or E/ the polyaminoborane has the formula $[R^5NH-BR^3R^4]_n$, wherein $R^3$ and $R^4$ are identical or different and selected from the group consisting of a hydrogen atom, a substituted or unsubstituted heteroatom and a linear, branched, cyclic or cyclic and branched organic group having from 1 to 30 carbon atoms, such as from 2 to 28, 3 to 24, 4 to 20 or 5 to 16 carbon atoms; or $R^3$ and $R^4$ together form a cyclic or cyclic and branched organic group having from 3 to 30 carbon atoms, such as from 4 to 20 or 5 to 16 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; and wherein n is a number (e.g. relative integer) greater than 10; and/or F/ the polyaminoborane has the formula $[R^5NH-BR^3R^4]_m [R^6NH-BR^3R^4]_{(n-m)}$, wherein $R^3$ and $R^4$ are the same or different and selected from the group consisting of a hydrogen atom, a substituted or unsubstituted heteroatom and a linear, branched, cyclic or cyclic and branched organic group having 1 to 30 carbon atoms, such as 2 to 28, 3 to 24, 4 to 20 or 5 to 16 carbon atoms; or $R^3$ and $R^4$ together form a cyclic or cyclic and branched organic group having from 3 to 30 carbon atoms, such as from 4 to 20 or 5 to 16 carbon atoms; wherein $R^5$ and $R^6$ are different and selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; wherein n is a number greater than 10; and wherein m is a number (e.g. relative integer) greater than or equal to 10 and less than n.

According to one or more embodiments, the process involves reacting a plurality of monomers, for example two or three or more different monomers, with aminoborane.

Advantageously, the secondary amino group ($NR^1R^2$) bound to boron forms a significant steric hindrance stabilizing the aminoborane in a monomeric or dimeric form. Thus, said secondary amino group allows a balance sufficiently displaced towards the monomeric form of the aminoborane to be obtained to allow the reaction between the aminoborane and the at least one monomer. In addition, since said monomer is less sterically hindered than the secondary amino group, the substitution of the secondary amino group by said monomer is promoted, thus producing the polyaminoborane. Since the $R^3$ and $R^4$ groups are not involved when the secondary amino group is substituted by the monomer, $R^3$ and/or $R^4$ substituted aminoboranes may also be used in the process of the present description.

According to one or more embodiments, at least one of $R^1$ and $R^2$ is a branched, cyclic or cyclic and branched organic group having from 3 to 24 carbon atoms, such as from 4 to 20 or 5 to 16 carbon atoms; or $R^1$ and $R^2$ together form a cyclic or cyclic and branched organic group having from 3 to 24 carbon atoms, such as from 4 to 20 or 5 to 16 carbon atoms. According to one or more embodiments, at least one of $R^1$ and $R^2$ is a branched or cyclic and branched organic group having from 3 to 24 carbon atoms, such as from 4 to 20 or 5 to 16 carbon atoms; or $R^1$ and $R^2$ together form a cyclic and branched organic group having from 3 to 24 carbon atoms, such as from 4 to 20 or 5 to 16 carbon atoms. According to one or more embodiments, at least one of $R^1$ and $R^2$ is a branched organic group having from 3 to 24 carbon atoms, such as from 4 to 20 or 5 to 16 carbon atoms.

According to one or more embodiments, at least one of $R^1$ and $R^2$ is an organic group of 3 to 24 carbon atoms. According to one or more embodiments, at least one of $R^1$ and $R^2$ is an organic group of 4 to 20 carbon atoms. According to one or more embodiments, at least one of $R^1$ and $R^2$ is an organic group of 5 to 16 carbon atoms. According to one or more embodiments, $R^1$ and $R^2$ together form a cyclic organic group of 3 to 24 carbon atoms. According to one or more embodiments, $R^1$ and $R^2$ together form a cyclic organic group of 4 to 20 carbon atoms. According to one or more embodiments, $R^1$ and $R^2$ together form a cyclic organic group of 5 to 16 carbon atoms.

According to one or more embodiments, at least one of $R^1$ and $R^2$ is selected from the group consisting of substituted or unsubstituted alkyl, substituted or unsubstituted alkenyl, substituted or unsubstituted alkynyl, substituted or unsubstituted aryl and substituted or unsubstituted heteroaryl. According to one or more embodiments, at least one of $R^1$ and $R^2$ is selected from the group consisting of substituted or unsubstituted alkylalkenyl, substituted or unsubstituted alkenylalkyl, substituted or unsubstituted alkylalkynyl, substituted or unsubstituted alkynylalkyl, substituted or unsubstituted alkylaryl, substituted or unsubstituted alkylaryl, substituted or unsubstituted arylalkyl, substituted or unsubstituted alkylheteroaryl, substituted or unsubstituted heteroarylalkyl, a substituted or unsubstituted arylalkenyl, a substituted or unsubstituted heteroarylalkenyl, a substituted or unsubstituted alkenylaryl, a substituted or unsubstituted alkenylheteroaryl, a substituted or unsubstituted arylalkynyl, a substituted or unsubstituted heteroarylalkynyl, a substituted or unsubstituted alkynylaryl and a substituted or unsubstituted alkynylheteroaryl, $R^1$ and/or $R^2$ comprising from 2 to 30 carbon atoms, such as from 3 to 24, 4 to 20 or 5 to 16 carbon atoms.

According to one or more embodiments, at least one of $R^1$ and $R^2$ is selected from the group consisting of substituted or unsubstituted alkyl and substituted or unsubstituted alkylaryl, $R^1$ and/or $R^2$ comprising from 2 to 30 carbon atoms, such as from 3 to 24, 4 to 20 or 5 to 16 carbon atoms. According to one or more embodiments, at least one of $R^1$ and $R^2$ is a substituted or unsubstituted alkyl having from 2 to 30 carbon atoms, such as from 3 to 24, 4 to 20 or 5 to 16 carbon atoms. According to one or more embodiments, at least one of $R^1$ and $R^2$ is selected from the group consisting of branched and substituted or unsubstituted propyl, branched and substituted or unsubstituted butyl, branched and substituted or unsubstituted pentyl, substituted or unsubstituted cyclopentyl, substituted or unsubstituted cyclohexyl, substituted or unsubstituted pyrrole and substituted or unsubstituted α-methylbenzyl; or $R^1$ and $R^2$ together form a cyclic and branched group having from 5 to 16 carbon atoms, such as a pyrrolidine or a branched piperidine. According to one or more embodiments, at least one of $R^1$ and $R^2$ is a chiral group.

According to one or more embodiments, the secondary amino group has one of the following formulas:

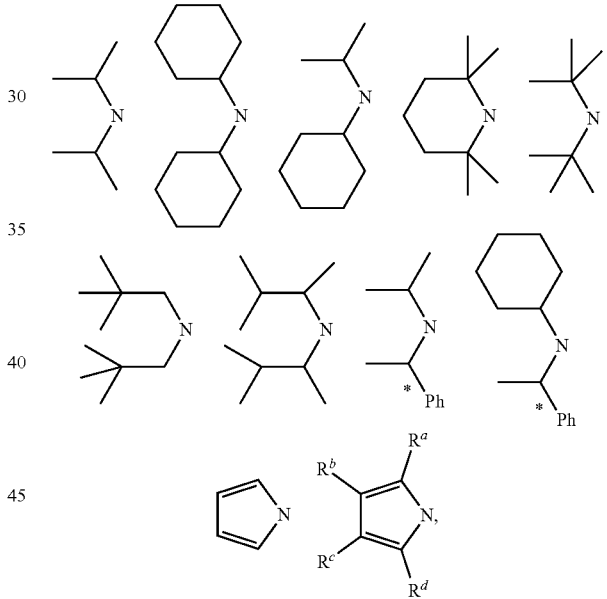

wherein $R^a$—$R^d$ are independently selected from the group consisting of a hydrogen atom and hydrocarbon substituents.

According to one or more of the production processes herein, the aminoborane is in a liquid state at −40° C. and 100 kPa. Advantageously, the monomer can be condensed with the aminoborane, for example at low temperature.

According to one or more production processes, the aminoborane is a diisopropylaminoborane.

According to one or more embodiments, $R^3$ and $R^4$ are the same or different and selected from the group consisting of a hydrogen atom, a substituted or unsubstituted heteroatom and a linear, branched, cyclic or cyclic and branched organic group having from 1 to 30 carbon atoms, such as from 2 to 28, 3 to 24, 4 to 20 or 5 to 16 carbon atoms; or $R^3$ and $R^4$ together form a cyclic or cyclic and branched organic group having from 3 to 30 carbon atoms, such as from 4 to 20 or 5 to 16 carbon atoms.

According to one or more embodiments, at least one of $R^3$ and $R^4$ is an organic group of 2 to 28 carbon atoms. According to one or more embodiments, at least one of $R^3$ and $R^4$ is an organic group of 3 to 24 carbon atoms. According to one or more embodiments, at least one of $R^3$ and $R^4$ is an organic group of 4 to 20 carbon atoms. According to one or more embodiments, at least one of $R^3$ and $R^4$ is an organic group of 5 to 16 carbon atoms. According to one or more embodiments, $R^3$ and $R^4$ together form an organic group of 4 to 20 carbon atoms. According to one or more embodiments, $R^3$ and $R^4$ together form an organic group of 5 to 16 carbon atoms.

According to one or more embodiments, at least one of $R^3$ and $R^4$ is selected from the group consisting of a hydrogen atom; a substituted or unsubstituted heteroatom; and a substituted or unsubstituted alkyl, a substituted or unsubstituted alkenyl, a substituted or unsubstituted alkynyl, a substituted or unsubstituted aryl and a substituted or unsubstituted heteroaryl. According to one or more embodiments, at least one of $R^3$ and $R^4$ is selected from the group consisting of a hydrogen atom, a substituted or unsubstituted heteroatom, a substituted or unsubstituted alkylalkenyl, a substituted or unsubstituted alkenylalkyl, a substituted or unsubstituted alkylalkynyl, a substituted or unsubstituted alkynylalkyl, a substituted or unsubstituted alkylaryl, a substituted or unsubstituted arylalkyl, a substituted or unsubstituted alkylheteroaryl, a substituted or unsubstituted heteroarylalkyl, a substituted or unsubstituted arylalkenyl, a substituted or unsubstituted heteroarylalkenyl, a substituted or unsubstituted alkenylaryl, a substituted or unsubstituted alkenylheteroaryl, a substituted or unsubstituted arylalkynyl, a substituted or unsubstituted heteroarylalkynyl, a substituted or unsubstituted alkynylaryl, a substituted or unsubstituted alkynylheteroaryl, $R^3$ and/or $R^4$ comprising from 1 to 30 carbon atoms, such as from 2 to 28, 3 to 24, 4 to 20 or 5 to 16 carbon atoms.

According to one or more embodiments, at least one of $R^3$ and $R^4$ is a hydrogen atom. According to one or more embodiments, $R^3$ and $R^4$ are hydrogen atoms. According to one or more embodiments, at least one of $R^3$ and $R^4$ is a substituted or unsubstituted alkyl having from 1 to 30 carbon atoms, such as from 2 to 28, 3 to 24, 4 to 20 or 5 to 16 carbon atoms. According to one or more embodiments, $R^3$ and $R^4$ are substituted or unsubstituted alkyl having from 1 to 30 carbon atoms, such as from 2 to 28, 3 to 24, 4 to 20 or 5 to 16 carbon atoms.

According to one or more embodiments, $R^5$ and $R^6$ are different and selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms.

According to one or more embodiments, at least one of $R^5$ and $R^6$ is selected from a group consisting of an organic group having from 2 to 28 carbon atoms. According to one or more embodiments, at least one of $R^5$ and $R^6$ is selected from a group consisting of an organic group having from 3 to 24 carbon atoms. According to one or more embodiments, at least one of $R^5$ and $R^6$ is selected from the group consisting of an organic group having from 4 to 20 carbon atoms. According to one or more embodiments, at least one of $R^5$ and $R^6$ is selected from a group consisting of an organic group having from 5 to 16 carbon atoms.

According to one or more embodiments, at least one of $R^5$ and $R^6$ is selected from the group consisting of a hydrogen atom; a substituted or unsubstituted nitrogen atom; and a substituted or unsubstituted alkyl, a substituted or unsubstituted alkenyl, a substituted or unsubstituted alkynyl, a substituted or unsubstituted aryl and a substituted or unsubstituted heteroaryl. According to one or more embodiments, at least one of $R^5$ and $R^6$ is selected from the group consisting of a hydrogen atom, a substituted or unsubstituted nitrogen atom, a substituted or unsubstituted alkylalkenyl, a substituted or unsubstituted alkenylalkyl, a substituted or unsubstituted alkylalkynyl, a substituted or unsubstituted alkynylalkyl, a substituted or unsubstituted alkylaryl, a substituted or unsubstituted arylalkyl, a substituted or unsubstituted alkylheteroaryl, a substituted or unsubstituted heteroarylalkyl, a substituted or unsubstituted arylalkenyl, a substituted or unsubstituted heteroarylalkenyl, a substituted or unsubstituted alkenylaryl, a substituted or unsubstituted alkenylheteroaryl, a substituted or unsubstituted arylalkynyl, a substituted or unsubstituted heteroarylalkynyl, a substituted or unsubstituted alkynylaryl and a substituted or unsubstituted alkynylheteroaryl, $R^5$ and/or $R^6$ comprising from 1 to 30 carbon atoms, such as from 2 to 28, 3 to 24, 4 to 20 or 5 to 16 carbon atoms.

According to one or more embodiments, at least one of $R^5$ and $R^6$ is selected from the group consisting of a hydrogen atom; a substituted or unsubstituted nitrogen atom; and a substituted or unsubstituted alkyl, a substituted or unsubstituted alkylalkenyl, a substituted or unsubstituted alkylalkynyl, a substituted or unsubstituted alkylaryl, and a substituted or unsubstituted alkylheteroaryl, $R^5$ and/or $R^6$ comprising from 1 to 30 carbon atoms, such as from 2 to 28, 3 to 24, 4 to 20 or 5 to 16 carbon atoms.

According to one or more embodiments, at least one of $R^5$ and $R^6$ is selected from the group consisting of a hydrogen atom; a substituted or unsubstituted nitrogen atom; a methyl group; an ethyl group; an n-propyl; an n-butyl; a substituted or unsubstituted allyl; a substituted or unsubstituted propargyl; and a linear, branched, cyclic or cyclic and branched organic group having from 3 to 24 carbon atoms, such as from 4 to 20 or 5 to 16 carbon atoms and substituted with at least one alkene and/or alkyne-type insaturation, and/or substituted with at least one ether and/or thioether function, and/or substituted with at least one secondary amine function, phosphine and/or silyl. According to one or more embodiments, said nitrogen atom is substituted with a single substituent (other than a hydrogen atom).

According to one or more embodiments, at least one of $R^5$ and $R^6$ is an alkyl group having from 1 to 30 carbon atoms, such as from 2 to 28, 3 to 24, 4 to 20 or 5 to 16 carbon atoms substituted by one or several functional groups selected from the list consisting of an ether, thioether, secondary amine, phosphine, silyl, alkene and alkyne.

According to one or more embodiments, at least one of $R^1$ to $R^6$ and $R^a$ to $R^d$ is an alkyl group having from 1 to 30 carbon atoms, such as from 2 to 28, 3 to 24, 4 to 20 or 5 to 16 carbon atoms substituted by one or several functional groups selected from the list consisting of alkyl, alkene, alkyne, aryl, heteroaryl, alcohol, ketone, benzoyl, aldehyde, carbonate, carboxylic acid, carboxylate, ester, ether oxide, heterocycle, amine, amide, azo, diazo, diazoamino, azide, secondary imine, hydrazine, hydrazone, amidine, carbamate, guanidine, carbodiimide, nitrile, isonitrile, imide, azide, diimide, thiol, thioether, thioketone, cyanate, nitrate, nitrite, nitro, nitroso, oxime, pyridyl, disulfide, sulfinyl, sulfonyl, thiocyanate, isothiocyanate, thione, phosphorane, phosphine, boronate, borinate, silane groups and halogen, the functional groups comprising from 0 to 20 carbon atoms, for example comprising from 1 to 15 carbon atoms.

According to one or more embodiments, at least one of $R^1$ to $R^6$ and $R^a$ to $R^d$ also includes one or several heteroatoms.

According to one or more embodiments, at least one of $R^1$ to $R^6$ further comprises one or several heteroatoms selected from the group consisting of N, O, S, P, Si, Sn, Ge, As, F, Cl, Br and I.

According to one or several production processes herein, the polyaminoborane is in polymeric or co-polymeric form and n is greater than about 100. According to one or more embodiments, n is greater than about 250. According to one or more embodiments, n is greater than about 500. According to one or more embodiments, n is greater than about 1000. According to one or more embodiments, n is greater than about 2500. According to one or more embodiments, n is greater than about 5000. According to one or more embodiments, n is greater than about 10000. According to one or more embodiments, n is greater than about 25000.

According to one or several production processes herein, the polyaminoborane is in oligomeric or co-oligomeric form and n is between about 10 and about 100. According to one or more embodiments, n is between about 10 and about 75. According to one or more embodiments, n is between about 10 and about 50. According to one or more embodiments, n is between about 10 and about 40.

According to one or more embodiments, m is between about 0.01×n and about 0.99×n. According to one or more embodiments, m is between about 0.1×n and about 0.9×n. According to one or more embodiments, m is between about 0.2×n and about 0.8×n. According to one or more embodiments, m is between about 0.3×n and about 0.7×n. According to one or more embodiments, m is between about 0.4×n and about 0.6×n.

According to one or more embodiments, the process further comprises: providing one of the aminoborane and at least one monomer; adding the other aminoborane and at least one monomer; and mixing the aminoborane with the at least one monomer under reaction conditions sufficient to form the polyaminoborane.

According to one or more embodiments, the at least one monomer is in a gaseous state at 0° C. and 100 kPa, the process further comprising supplying the aminoborane and adding the at least one monomer to the aminoborane.

According to one or more embodiments, the reaction is carried out with or without a catalyst. According to one or more embodiments, the reaction is carried out with or without a reaction solvent. According to one or more embodiments, the source of boron included in the polyaminoborane consists substantially of boron included in the aminoborane. Advantageously, it is not necessary to provide and add a source of boron other than the aminoborane. For example, it is not necessary to prepare and add an additional borane in the reaction mixture to form an ammonia-borane, amine-borane or hydrazine-borane adduct to produce the polyaminoborane.

According to one or more embodiments, the process also includes: the heating of the reaction mixture to a temperature between 15 and 30° C.

According to one or more embodiments, the process also includes: the addition of a filtration solvent after the mixing step; and the filtration of the polyaminoborane. According to one or more embodiments, the process also includes: the washing of the filtered polyaminoborane with a washing solvent; and the drying of the washed polyaminoborane. According to one or more embodiments, the drying step is carried out under vacuum. According to one or more embodiments, the process further includes: the isolation of the polyaminoborane. According to one or more embodiments, the isolation of the polyaminoborane is carried out by dialysis.

According to one or more embodiments, the reaction solvent, the filtration solvent and/or the washing solvent are identical or different and selected from the group consisting of ethyl ether, acetonitrile, a linear, branched, cyclic or cyclic and branched alkane with 5 to 8 carbon atoms such as pentane, hexane, cyclohexane, heptane, tert-butyl methyl ether, tert-amyl methyl ether, benzene, toluene, tetrahydrofurane, dichloromethane and chloroform. According to one or more embodiments, the reaction solvent, filtration solvent and/or washing solvent are anhydrous solvents.

According to one or more embodiments, the addition and/or mixing is carried out at a predetermined temperature. According to one or more embodiments, the addition and/or mixing is carried out at a temperature less than or equal to about 30° C. According to one or more embodiments, the addition and/or mixing is carried out at a temperature less than or equal to about 0° C. According to one or more embodiments, the addition and/or mixing is carried out at a temperature less than or equal to approximately −15° C. According to one or more embodiments, the addition and/or mixing is carried out at a temperature less than or equal to approximately −30° C. According to one or more embodiments, the addition and/or mixing is carried out at a temperature between approximately −35° C. and approximately −100° C. Advantageously, longer-chain polyaminoboranes can be obtained when the addition and/or mixing is carried out at low temperatures, such as between about −40° C. and about −60° C. Advantageously, polyaminoboranes can also be obtained when the addition and/or mixing is carried out at room temperature. It is understood herein that it is not essential to perform the polymerization reaction at a particular temperature to obtain a polyaminoborane.

According to one or more embodiments, the addition is carried out over a predetermined period of time. Advantageously, longer-chain polyaminoboranes can be obtained when the addition is made over a predetermined period of time, such as dropwise. According to one or more embodiments, the addition time is greater than or equal to about 1 second. According to one or more embodiments, the addition time is between about 10 seconds and about 15 minutes. According to one or more embodiments, the addition time is between about 20 seconds and about 10 minutes. According to one or more embodiments, the addition time is between about 30 seconds and about 5 minutes. It is understood herein that a polyaminoborane can be obtained by means of shorter or longer addition times than those defined above. For example, a polyaminoborane can also be obtained when the addition is made in a single portion of the second reagent.

According to one or more embodiments, the mixing is carried out over a period between about 1 minute and about 12 hours. According to one or more embodiments, the mixing is carried out over a mixing time between about 15 minutes and about 6 hours. According to one or more embodiments, the mixing is carried out over a mixing time between about 30 minutes and about 6 hours. According to one or more embodiments, the mixing is carried out over a mixing time comprised between about 1 hour and about 3 hours. It is understood herein that a polyaminoborane can be obtained by means of shorter or longer mixing times than those defined above.

According to one or more embodiments, the reaction temperature, i.e. the mixing temperature, can be changed, for example from a first mixing temperature to a second mixing temperature. According to one or more embodiments, the first mixing temperature is lower than the second mixing temperature. According to one or more embodiments, the first mixing temperature is a mixing temperature as defined above and the second mixing temperature is between about 15 and about 30° C.

According to one or more embodiments, the addition and/or mixing is carried out at a predetermined pressure. According to one or more embodiments, the addition and/or mixing is carried out at high pressure, such as up to about 10 MPa, or under vacuum, such as up to about $10^{-6}$ Pa. According to one or more embodiments, the addition and/or mixing is carried out at a pressure between about 1 MPa and about $10^{-5}$ Pa. According to one or more embodiments, the addition and/or mixing is carried out at approximately atmospheric pressure. It is understood herein that a polyaminoborane can be obtained under addition and/or mixing pressures other than those defined above.

According to one or more embodiments, the reaction is carried out under an oxidizing, reducing or inert atmosphere. According to one or more embodiments, the reaction is carried out under an inert atmosphere. According to one or more embodiments, the reaction is carried out under argon or nitrogen. Advantageously, polyaminoboranes with particularly long chains can be obtained when the reaction is carried out under an inert atmosphere, such as argon or nitrogen. It is understood herein that a polyaminoborane can also be obtained under air.

According to one or more embodiments, the molar ratio of aminoborane to the sum of monomers is between about 0.5 and about 2. Advantageously, it is not necessary to carry out the reaction using a quantity of monomers in excess of aminoborane. According to one or more embodiments, the molar ratio of the aminoborane to the sum of monomers is between about 0.9 and about 1.5. According to one or more embodiments, the molar ratio of the aminoborane to the sum of monomers is between about 0.99 and about 1.25. According to one or more embodiments, the molar ratio of the aminoborane to the sum of monomers is approximately stoichiometric. According to one or more embodiments, the at least one monomer is in excess of the amount of aminoborane. Advantageously, it is not necessary to perform the reaction by using a stoichiometric molar ratio of the aminoborane to the sum of monomers.

According to one or more embodiments, the molar ratio of the first monomer to the second monomer is between about 0.01 and about 99. Advantageously, it is not necessary to perform the reaction by using a stoichiometric molar ratio of the first monomer to the second monomer. According to one or more embodiments, the molar ratio of the first monomer to the second monomer is between about 0.1 and about 90. According to one or more embodiments, the molar ratio of the first monomer to the second monomer is between about 0.25 and about 4. According to one or more embodiments, the molar ratio of the first monomer to the second monomer is between about 0.5 and about 2. According to one or more embodiments, the molar ratio of the first monomer to the second monomer is between about 0.66 and about 1.5.

The present description also includes a polyaminoborane prepared, for example, by the process according to the first aspect. More precisely, according to the second aspect, the polyaminoborane comprises at least one repeating unit of formula $R^5NH$—$BR^3R^4$, wherein $R^3$ and $R^4$ are the same or different and are selected from the group consisting of a hydrogen atom, a substituted or unsubstituted heteroatom and a linear, branched, cyclic or cyclic and branched organic group having 1 to 30 carbon atoms, such as 2 to 28, 3 to 24, 4 to 20 or 5 to 16 carbon atoms; or $R^3$ and $R^4$ together form a cyclic or cyclic and branched organic group having from 3 to 30 carbon atoms, such as from 4 to 20 or 5 to 16 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; wherein if $R^5$ is a hydrogen atom or a methyl group, at least one of $R^3$ and $R^4$ is not a hydrogen atom; and wherein if $R^5$ is a n-butyl group, at least one of $R^3$ and $R^4$ is not a hydrogen atom or the polyaminoborane has a weight average molecular weight equal to or greater than about 500,000 or more, preferably equal to or greater than about 1,000,000 or more, more preferably equal to or greater than about 2,000,000.

According to one or more embodiments, the polyaminoborane contains at least 10 repeating units (polymeric or oligomeric form). According to one or more embodiments, the polyaminoborane contains more than 100 repeating units (polymeric form). According to one or more embodiments, the polyaminoborane contains between 10 and 100 repeating units (oligomeric form).

According to one or more embodiments, $R^3$ and $R^4$ are defined as indicated above in the embodiments according to the first aspect.

According to one or more embodiments, $R^5$ is defined as indicated above in the embodiments according to the first aspect, for example under the conditions that if $R^5$ is a hydrogen atom or a methyl group, at least one of $R^3$ and $R^4$ is not a hydrogen atom; and if $R^5$ is a n-butyl group, at least one of $R^3$ and $R^4$ is not a hydrogen atom or the polyaminoborane has a weight average molecular weight greater than or equal to about 500,000, 1,000,000 or 2,000,000.

According to one or more embodiments, $R^5$ is selected from the group consisting of a substituted or unsubstituted nitrogen atom and a linear, branched, cyclic or cyclic and branched organic group having from 2 to 30 carbon atoms, such as from 3 to 24, 4 to 20 or 5 to 16 carbon atoms.

According to one or more embodiments, $R^5$ is selected from the group consisting of a substituted or unsubstituted nitrogen atom; and a substituted or unsubstituted alkyl, a substituted or unsubstituted alkenyl, a substituted or unsubstituted alkynyl, a substituted or unsubstituted aryl and a substituted or unsubstituted heteroaryl. According to one or more embodiments, $R^5$ is selected from the group consisting of a substituted or unsubstituted nitrogen atom, a substituted or unsubstituted alkylalkenyl, a substituted or unsubstituted alkenylalkyl, a substituted or unsubstituted alkylalkynyl, a substituted or unsubstituted alkynylalkyl, a substituted or unsubstituted alkylaryl, a substituted or unsubstituted arylalkyl, a substituted or unsubstituted alkylheteroaryl, a substituted or unsubstituted heteroarylalkyl, a substituted or unsubstituted arylalkenyl, a substituted or unsubstituted heteroarylalkenyl, a substituted or unsubstituted alkenylaryl, a substituted or unsubstituted alkenylheteroaryl, a substituted or unsubstituted arylalkynyl, a substituted or unsubstituted heteroarylalkynyl, a substituted or unsubstituted alkynylaryl and a substituted or unsubstituted alkynylheteroaryl, $R^5$ comprising from 2 to 30 carbon atoms, such as from 3 to 24, 4 to 20 or 5 to 16 carbon atoms.

According to one or more embodiments, $R^5$ is selected from the group consisting of a substituted or unsubstituted nitrogen atom; and a substituted or unsubstituted alkyl, a substituted or unsubstituted alkylalkenyl, a substituted or unsubstituted alkylalkynyl, a substituted or unsubstituted alkylaryl and a substituted or unsubstituted alkylheteroaryl, $R^5$ comprising from 2 to 30 carbon atoms, such as from 3 to 24, 4 to 20 or 5 to 16 carbon atoms.

According to one or more embodiments, $R^5$ is selected from the group consisting of a substituted or unsubstituted nitrogen atom and a substituted or unsubstituted alkyl having from 2 to 30 carbon atoms, such as from 3 to 24, 4 to 20 or 5 to 16 carbon atoms. According to one or more embodiments, $R^5$ is a nitrogen atom or an alkyl group having from 2 to 30 carbon atoms, such as from 3 to 24, 4 to 20 or 5 to 16 carbon atoms, substituted with one or more functional groups selected from the list consisting of an alkene, an alkyne, an ether, a thioether, a secondary amine, a phosphine and a silyl. According to one or more embodiments, $R^5$ is selected from the group consisting of a substituted or unsubstituted nitrogen atom; ethyl; n-propyl; n-butyl; a substituted or unsubstituted allyl; a substituted or unsubstituted propargyl; and a linear, branched, cyclic or cyclic and branched organic group having from 3 to 24 carbon atoms, such as from 4 to 20 or 5 to 16 carbon atoms, and optionally comprising at least one unsaturated group, such as an alkene and/or alkyne group, and/or at least one ether and/or thioether function, and/or a secondary amine function, phosphine and/or silyl. According to one or more embodiments, $R^5$ is an alkyl group having from 3 to 24 carbon atoms, such as from 4 to 20 or 5 to 16 carbon atoms, substituted with one or more functional groups selected from the list consisting of ether, thioether, secondary amine, phosphine, silyl, alkene and alkyne.

According to one or more embodiments, $R^5$ is an alkyl group substituted by one or more functional groups selected from the group consisting of alkyl, alkene, alkyne, aryl, heteroaryl, alcohol, ketone, benzoyl, aldehyde, carbonate, carboxylic acid, carboxylate, ester, ether oxide, heterocycle, amine, amide, azo, diazo, diazoamino, azide, secondary imine, hydrazine, hydrazone, amidine, carbamate, guanidine, carbodiimide, nitrile, isonitrile, imide, azide, diimide, thiol, thioether, thioketone, cyanate, nitrate, nitrite, nitro, nitroso, oxime, pyridyl, thioether, disulfide, sulfinyl, sulfonyl, thiocyanate, isothiocyanate, thione, phosphorane, phosphine, boronate, borinate, silane and halogen, the functional groups comprising from 0 to 20 carbon atoms, for example comprising from 1 to 15 carbon atoms.

According to one or more embodiments, $R^5$ further comprises one or several heteroatoms. According to one or more embodiments, $R^5$ comprises a heteroatom selected from the group consisting of N, O, S, P, Si, Sn, Ge, As, F, Cl, Br and I.

According to one or more embodiments, the polyaminoborane has the following formula: $[R^5NH-BR^3R^4]_n$, wherein n is defined as indicated above in the embodiments according to the first aspect; and wherein if $R^5$ is a hydrogen atom or a methyl group, at least one of $R^3$ and $R^4$ is not a hydrogen atom; and wherein if $R^5$ is a n-butyl group, at least one of $R^3$ and $R^4$ is not a hydrogen atom or the polyaminoborane has a weight average molecular weight greater than or equal to about 500,000.

According to one or more embodiments, the polyaminoborane has the following formula: $[R^5NH-BR^3R^4]_m [R^6NH-BR^3R^4]_{(n-m)}$, wherein n and m are defined as indicated above in the embodiments according to the first aspect; wherein $R^6$ is different from $R^5$ and $R^6$ is selected from the group consisting of a hydrogen atom, a substituted or unsubstituted nitrogen atom and a linear, branched, cyclic or cyclic and branched organic group having from 1 to 30 carbon atoms, such as from 2 to 28, 3 to 24, 4 to 20 or 5 to 16 carbon atoms; and wherein if $R^5$ is methyl, at least one of $R^3$ and $R^4$ is not a hydrogen atom, or $R^6$ is not a hydrogen atom or a n-butyl group. According to one or more embodiments, if $R^5$ is n-butyl, at least one of $R^3$ and $R^4$ is not a hydrogen atom, or $R^6$ is not a hydrogen atom or a methyl group. According to one or more embodiments, if $R^5$ is a hydrogen atom, at least one of $R^3$ and $R^4$ is not a hydrogen atom, or $R^6$ is not methyl or n-butyl. According to one or more embodiments, $R^6$ is defined as indicated above in the embodiments according to the first aspect, for example with the condition that if $R^5$ is methyl, at least one of $R^3$ and $R^4$ is not a hydrogen atom, or $R^6$ is not a hydrogen atom or a n-butyl group.

According to one or more embodiments, the molar ratio of a first repeating pattern to a second repeating pattern of the polyaminoborane is defined as indicated above in the embodiments according to the first aspect.

According to one or more embodiments, the polyaminoborane is a polymer or copolymer and has a mass average molecular weight (Mw) greater than or equal to about 50,000. According to one or more embodiments, the polyaminoborane has a mass average molecular weight greater than or equal to about 100,000. According to one or more embodiments, the polyaminoborane has a mass average molecular weight greater than or equal to about 200,000. According to one or more embodiments, the polyaminoborane has a mass average molecular weight greater than or equal to about 300,000. According to one or more embodiments, the polyaminoborane has a mass average molecular weight greater than or equal to about 400,000. According to one or more embodiments, the polyaminoborane has a mass average molecular weight greater than or equal to about 500,000. According to one or more embodiments, the polyaminoborane has a mass average molecular weight greater than or equal to about 900,000. According to one or more embodiments, the polyaminoborane has a mass average molecular weight greater than or equal to about 2,000,000.

According to one or more embodiments, the polyaminoborane is an oligomer or co-oligomer and has a mass average molecular weight between about 600 and about 4000. According to one or more embodiments, the polyaminoborane has a mass average molecular weight of between about 800 and about 3000. According to one or more embodiments, the polyaminoborane has a mass average molecular weight of between about 1000 and about 2000.

According to one or more embodiments, the polyaminoborane is a polymer or copolymer having a polydispersity (PD; PDI; Mw/Mn) between about 2 and about 8, such as between about 2 and about 6. According to one or more embodiments, the polyaminoborane is an oligomer or co-oligomer having a polydispersity of between about 1 and about 1.5.

The present description also includes uses of the polyaminoborane according to the second aspect and/or of a polyaminoborane prepared by the process according to the first aspect. More precisely, according to the third aspect, the polyaminoborane can be used for the preparation of a ceramic precursor or a ceramic. Indeed, the polyaminoboranes according to the present description are preferred precursors of ceramics, such as boron-based ceramics.

According to one or more embodiments, the polyaminoborane is used in a coating, shaping, impregnation or ceramization step.

According to one or more embodiments, the ceramic precursor or the ceramic is a material of the "BNX" type, wherein X is an atom such as C and Si. Advantageously, alternatives to the use of borazine for the preparation of ceramics are proposed using polyaminoboranes according to the present description. Indeed, a synthesis strategy involving the polymerization of borazine ($B_3N_3H_3$) to produce polyborazilene that can be shaped by means of amines before ceramization is known. On the other hand, borazine is difficult to handle and not very thermally stable.

According to a fourth aspect, the polyaminoborane according to the second aspect and/or a polyaminoborane prepared by the process according to the first aspect can be used for the production of boron nitride.

According to a fifth aspect, the polyaminoborane according to the second aspect and/or a polyaminoborane prepared by the process according to the first aspect can be used for the storage and/or production of dihydrogen.

According to a sixth aspect, the present description also concerns a ceramic or ceramic precursor comprising a polyaminoborane according to the second aspect and/or a polyaminoborane prepared by the process according to the first aspect.

According to one or more embodiments, the ceramic precursor and/or ceramic is a material for application in aeronautics and/or armament.

According to one or more embodiments, the ceramic is a boron nitride-based ceramic.

In a seventh aspect, the present description also includes a hydrogen fuel cell or an energy material comprising a polyaminoborane according to the second aspect and/or a polyaminoborane prepared by the process according to the first aspect.

According to one or more embodiments, the polyaminoborane is a hydrogen reservoir for the reversible chemical storage of dihydrogen.

Advantageously, the process of the present description allows the functionalization of polyaminoboranes by means of functional groups, such as ethyl and especially propargyl, allowing the preparation of energy materials, i.e. materials having the property of violently releasing energy by chemical transformation. According to one or more embodiments, the polyaminoborane includes a main mass loss level (e.g. weight loss range greater than 50, 60 or 70% of the total weight of the polyaminoborane) whose center point and/or temperature inflection point is below 190° C. as measured by thermogravimetry (ATG), for example under conditions of temperature rise of 10° C./min under $N_2$, for example using a "Thermogravimetric Analyzer TGA/DSC 1" from Mettler Toledo, for example under atmospheric pressure. According to one or more embodiments, the central point and/or temperature inflection point of the main level is located below a temperature chosen from a group consisting of 180° C., 170° C., 160° C., 150° C., 140° C., 130° C., 120° C., 110° C. and 100° C. and/or the main mass loss level is greater than 50, 60 or 70% of the total mass of the polyaminoborane. According to one or more embodiments, the centre point and/or temperature inflection point of the main level is below 105 or 100° C. and/or the main mass loss level is greater than 65 or 70% of the total mass of the polyaminoborane.

EXAMPLES

The process for the preparation of polyaminoboranes can be carried out according to two general protocols A) and B) in which a first reagent is added to a second reagent. Protocol A) includes the addition of a first amount (Q1) of the aminoborane, such as diisopropylaminoborane (DIAB) to a second amount (Q2) of ammonia, primary amine or substituted or unsubstituted hydrazine (A) or a mixture of ammonia, primary amines and/or substituted or unsubstituted hydrazines (A/A'; A/A'/A"; etc.). Protocol B) includes the addition of the second amount (Q2) of substituted or unsubstituted ammonia, primary amine or hydrazine or a mixture of substituted or unsubstituted ammonia, primary amines and/or hydrazines to the first amount (Q1) of the aminoborane. In these examples, the second reagent is added over a predetermined period of time, for example slowly, using a syringe.

Once the addition of the reagents is completed, the reaction is stored at a predetermined temperature (T1), for example −40° C., for a predetermined time (t1) that can vary from a few minutes, e.g. 1 minute, to a few hours, e.g. 1 hour. The temperature of the reaction medium is then varied to reach room temperature, for example 20° C., and the reaction medium is optionally stirred for one or several hours (t2), for example between 1 hour and 24 hours, at room temperature.

Although the reaction conditions of these examples allow the production of long-chain polyaminoboranes with high yields, the process can be carried out under other conditions, temperatures, durations and molar ratios for the addition.

When the selected primary amine and/or hydrazine is gaseous at room temperature and pressure, the reaction is preferably carried out by implementing protocol B) to condense the primary amine and/or hydrazine with the aminoborane, for example previously cooled to low temperature, for example in a reactor, such as a reactor or a Fisher-Porter cylinder.

According to one or more embodiments, polymerization is observed by a viscosity increase of the reaction medium and/or the appearance of a solid (e.g. white solid).

The polymer can be isolated by filtration, for example by prior addition of a volume (V1) of filtration solvent (S), preferably anhydrous. For example, the solid can be transferred to a sintered product, preferably under argon. The resulting solid can be washed with a washing solvent, for example by means of one or more volumes, such as two volumes (V1), of the same filtration solvent. The solid can be dried under vacuum, for example under high vacuum.

A sample of the polyaminoborane can be controlled by NMR $^{11}$B in $CDCl_3$, the absence of any signal other than that of the polyaminoborane being characteristic of a polymer free of soluble by-products. If necessary, the polyaminoborane can be washed again with an additional volume of washing solvent, for example until the absence of any NMR $^{11}$B signal of by-products in $CDCl_3$ is checked.

Gel permeation chromatography (GPC) analyses were performed on a Viscotek device equipped with a VE1122 pump (flow rate: 1 mL/min in THF containing 0.1% by weight of $nBu_4NBr$), a VE3580 refractive index variation detector heat-controlled at 40° C., a VE7510 degasser (80 kPa), a ChromTeck precolumn heat-controlled at 40° C., a T-Guard ("Organic Guard column" 10×4.6 mm) and a LT5000L ("mixed, medium organic" 300×7.8 mm) column. All elution curves were measured from a calibration curve performed with 7 standards of monodispersed polystyrenes (1160<$M_n$<102000 g·mol$^{-1}$).

The NMR solution analyses were performed on a Bruker Avance III 400 MHz device equipped with an Atma BBFO probe. The solid state NMR analyses were carried out on Bruker Avance I 300 MHZ (7T) instruments equipped with a CP/MAS 2.5 mm probe and Bruker AVANCE III 600 MHZ (14T) instrument equipped with MAS 2.5 mm dedicated $^{13}$C-$^{11}$B probe (configuration located at the Institut des Sciences Chimiques de Rennes, France), the samples being inserted into 2.5 mm $ZrO_2$ rotors.

Fourier Transform Infrared Spectrometry (FTIR) analyses of the polymers were performed on a Shimadzu IRAffinity-1 instrument equipped with an ATR module, with a resolution of 4 cm-1 and a DLaTGS detector. The crystal in the ATR module is made of Ge coated with KBr.

Thermogravimetric analyses (ATG) of the polymers were performed on a Mettler Toledo Thermogravimetric Analyzer TGA/DSC1 equipped with Star System software, with a ramp of 10° C./min under $N_2$ from 25° C. to 500° C. and using an Al 40 µl crucible.

The polymerization reactions of the examples correspond to the following synthesis diagrams:

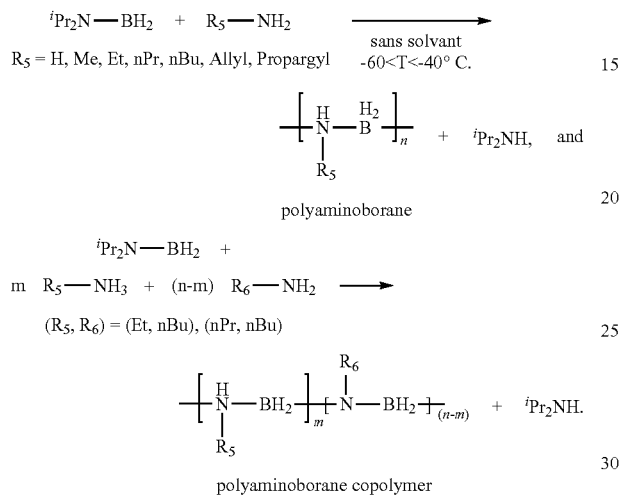

polyaminoborane

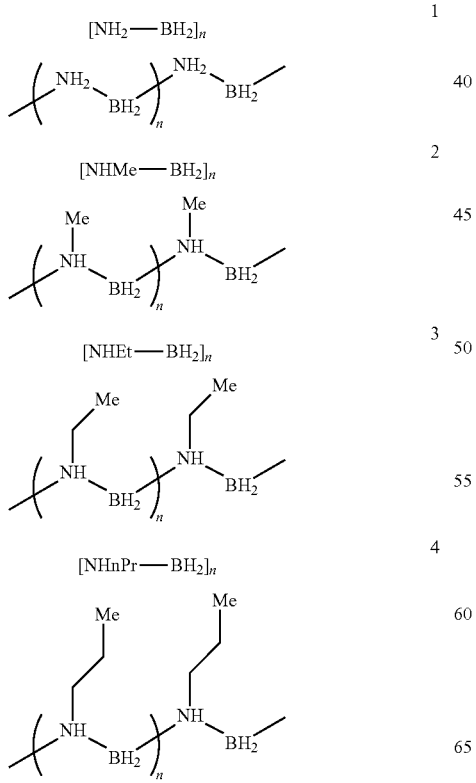

polyaminoborane copolymer

Polymers obtained from the examples have the following formulas:

(1)

$[NH_2\text{—}BH_2]_n$

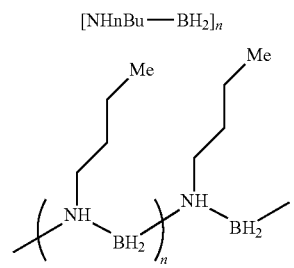

(2)

$[NHMe\text{—}BH_2]_n$ (3)

$[NHEt\text{—}BH_2]_n$

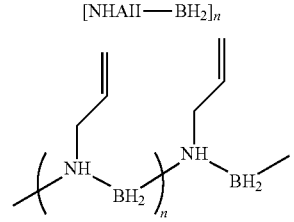

(4)

$[NHnPr\text{—}BH_2]_n$ (5)

$[NHnBu\text{—}BH_2]_n$

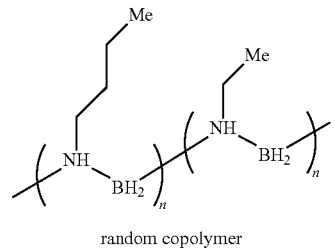

(6)

$[NHAll\text{—}BH_2]_n$

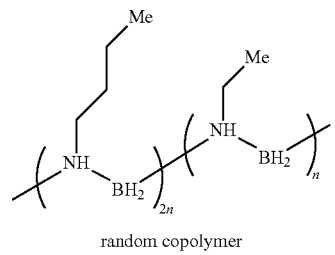

(7)

random copolymer (8)

random copolymer

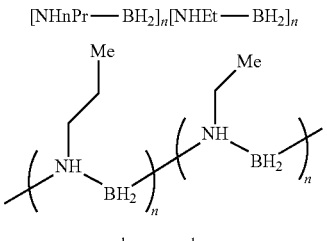

(9)

$[NHnPr\text{—}BH_2]_n[NHEt\text{—}BH_2]_n$ random copolymer (10)

$[NHnPr\text{—}BH_2]_{2n}[NHEt\text{—}BH_2]_n$

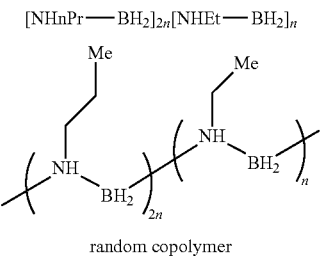

random copolymer

-continued

[PropargylNH—BH$_2$]$_n$ (11)

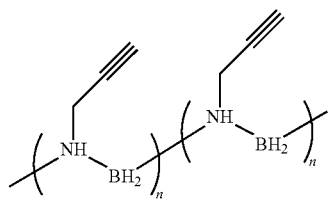

Preparation of Polyaminoborane [NH$_2$—BH$_2$]$_n$ (1)

Protocol B

| DIAB Q1 (mL) | A Q2 (NH$_2$) | T1 (° C.) | t1 (min) | t2 (h) | S | V1 (mL) | Rdt massique g (%) |
|---|---|---|---|---|---|---|---|
| 13 | Excess | −40 | 1 | 2 | MeCN | 3 × 15 | 1.712 g (74%) |

Elemental Analysis of 1:

| Element | Theoretical | Experimental |
|---|---|---|
| C | 0 | 3.78 |
| H | 13.98 | 13.22 |
| N | 48.55 | 42.62 |

GPC analysis of 1: 1 being an insoluble product under GPC analysis conditions, no signal was detected by GPC following filtration and injection.

Figure 2:
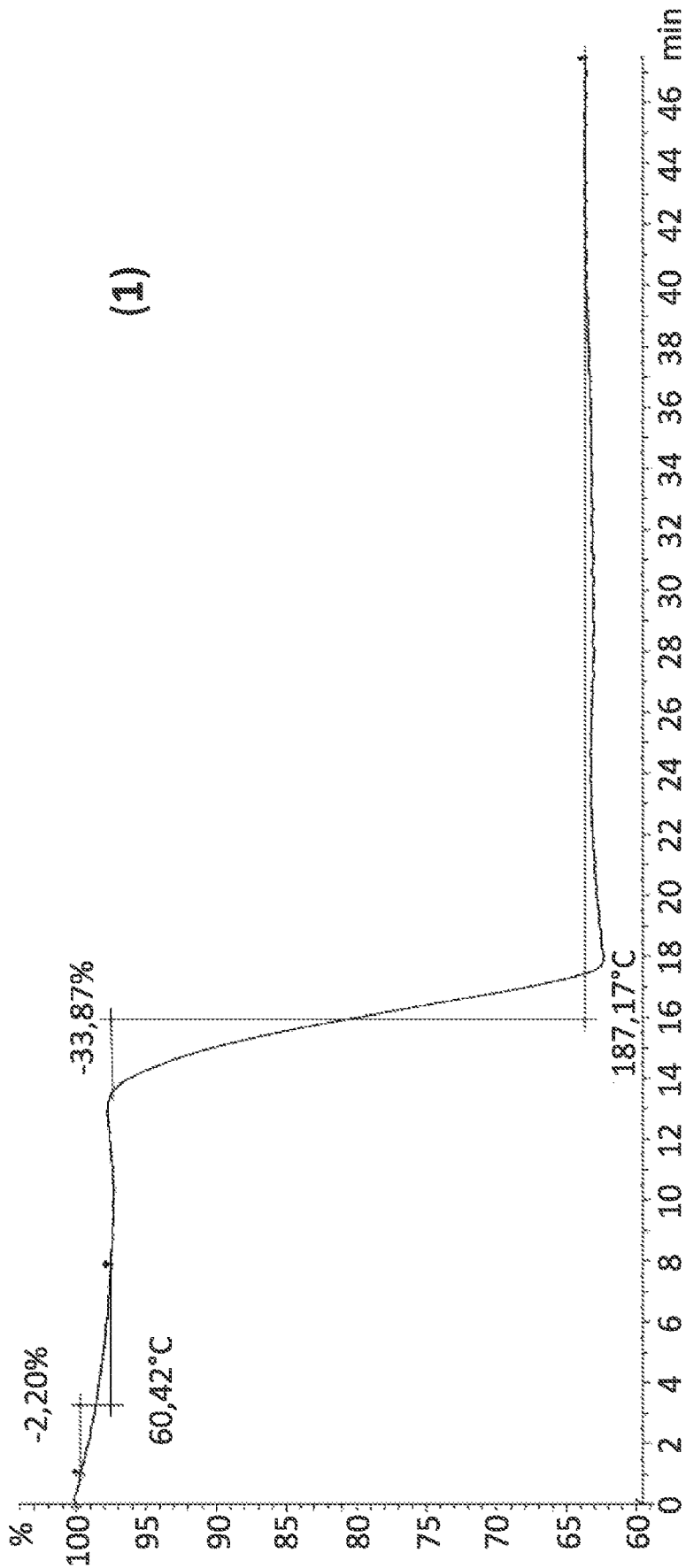
FIGS. 2 to 7 represent diagrams illustrating thermogravimetric analyses of the polyaminoboranes according to embodiments of the present description.

Solid state NMR 1: $^1$H MAS (303 K; 300.18 MHz; $\nu_{rotor}$=20 KHz): δ (ppm) −0.65, −2.57. $^{15}$N-CPMAS (303,0 K; 30.42 MHz; $\nu_{rotor}$=7 Kh): δ (ppm) 20.8. Spectrum $^{11}$B{$^1$H} Solid NMR MAS 7 kHz—Hahn Echo (see FIG. 1). IR analysis of 1: $\nu_{N-H}$≈3250 cm$^{-1}$; $\nu_{B-H}$≈2300 cm$^{-1}$. ATG analysis of 1: level 1: −2.20% or −0.11 mg, residue 97.44% or 4.92 mg, inflection point 39.53° C., central point 60.42° C.; level 2: −33.87% or −1.71 mg, residue 63.58% or 3.21 mg, inflection point 193.44° C., central point 187.17° C. (see FIG. 2).

Preparation of Polymethylaminoborane [MeNH—BH$_2$]$_n$ (2)

Protocol B

| DIAB Q1 (mL) | A (MeNH$_2$) Q2 | T1 (° C.) | t1 (min) | t2 (h) | S | V1 (mL) | Yield g (%) |
|---|---|---|---|---|---|---|---|
| 3 | Excess | −40 | 60 | 19 | MeCN | 3 × 15 | 0.1172 (15%) |

Elemental Analysis of 2:

| Element | Theoretical | Experimental |
|---|---|---|
| C | 28.01 | 28.59 |
| H | 14.11 | 13.96 |
| N | 32.67 | 31.74 |

GPC analysis of 2: (THF 0.1% by weight (w/w) n-Bu$_4$NBr); 1 mg/mL; after 1 day under stirring and subsequent filtration:

| Start RT (min) | Mn | Mw | Mz | Mp | PD |
|---|---|---|---|---|---|
| 6.550 | 74317 | 198131 | 500168 | 134889 | 2.666 |
| 8.933 | 1070 | 1357 | 1674 | 819 | 1.268 |

Mn: number average molecular weight
Mw: mass average molecular weight
Mz: viscosity average molecular weight
Mp: peak molecular weight
PD/PDI: polydispersity (Mw/Mn)

Figure 3:
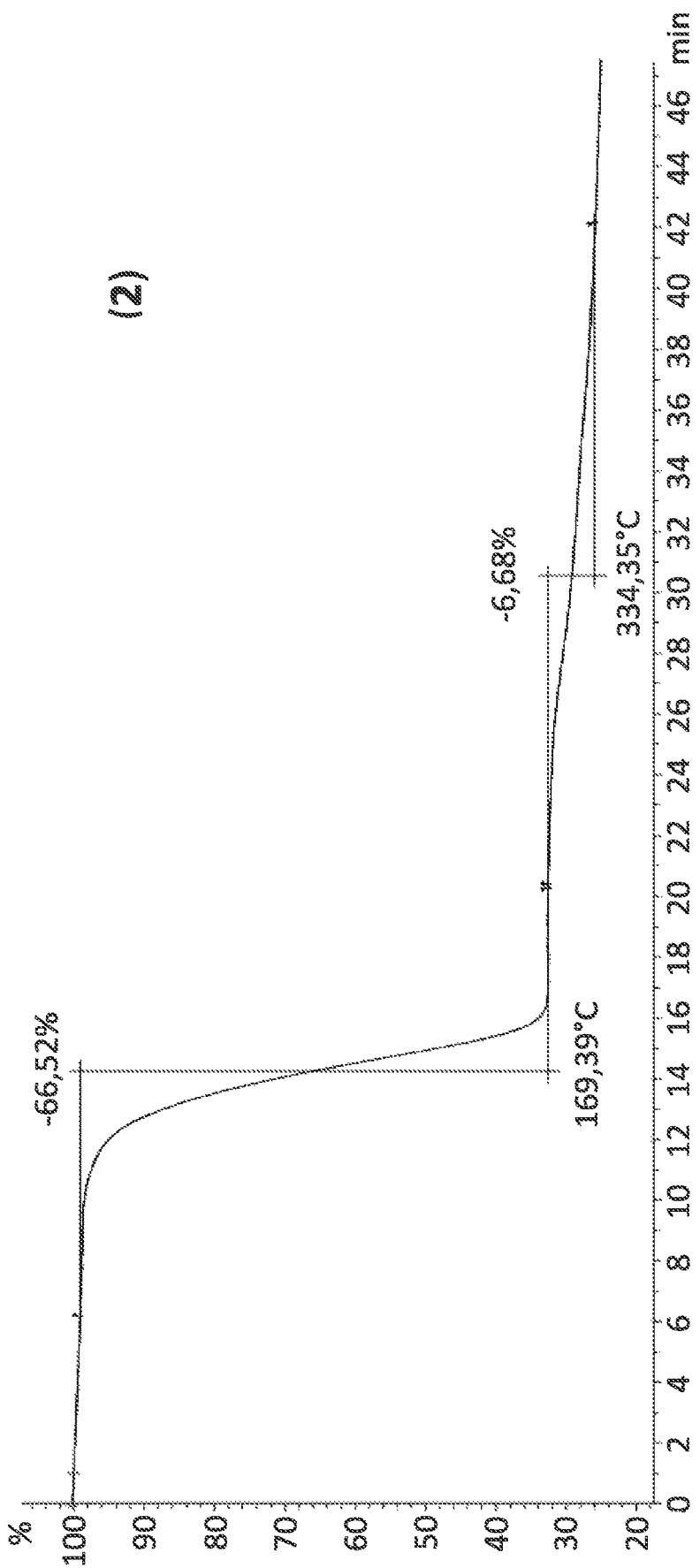

Solution NMR of 2: $^{11}$B{$^1$H}(CDCl$_3$): δ (ppm) −6.7. Solid state NMR of 2: $^{13}$C CPMAS (303.0 K; 75.48 MHz; $\nu_{rotor}$=7 KHz): δ (ppm) 32.44. Solid $^{11}$B{$^1$H} NMR spectrum MAS 7 kHz (cw 25 W): δ (ppm) −7.7 (see FIG. 1). IR analysis of 2: $\nu_{N-H}$≈3250 cm$^{-1}$; $\nu_{C-H}$≈2950 cm$^{-1}$; $\nu_{B-H}$≈2300 cm$^{-1}$. ATG analysis of 2: level 1: −66.52% or −3.69 mg, residue 32.39% or 1.79 mg, inflection point 174.32° C., central point 169.39° C.; level 2: −6.68% or −0.37 mg, residue 25.72% or 1.42 mg, inflection point 305.45° C., central point 334.35° C. (see FIG. 3).

Preparation of Polyethylaminoborane [EtNH—BH$_2$]$_n$ (3)

Protocol A

| DIAB Q1 (mL) | A (EtNH$_2$) Q2 (mL) | T1 (° C.) | t1 (min) | t2 (h) | S | V1 (mL) | Yield g (%) |
|---|---|---|---|---|---|---|---|
| 3 | 1.3 | −70 | 1 | 19 | Et$_2$O | 3 × 15 | 0.5894 (56%) |

Elemental Analysis of 3:

| Element | Theoretical | Experimental |
|---|---|---|
| C | 42.22 | 41.73 |
| H | 14.17 | 14.30 |
| N | 24.62 | 24.13 |

GPC analysis of 3: (THF 0.1% w/w n-Bu$_4$NBr); 1 mg/mL; after 1 day under stirring and subsequent filtration:

| Start RT (min) | Mn | Mw | Mz | Mp | PD |
|---|---|---|---|---|---|
| 6.730 | 80200 | 218000 | 837000 | 85600 | 2.72 |
| 8.970 | 936 | 1250 | 1730 | 724 | 1.34 |

Figure 4:
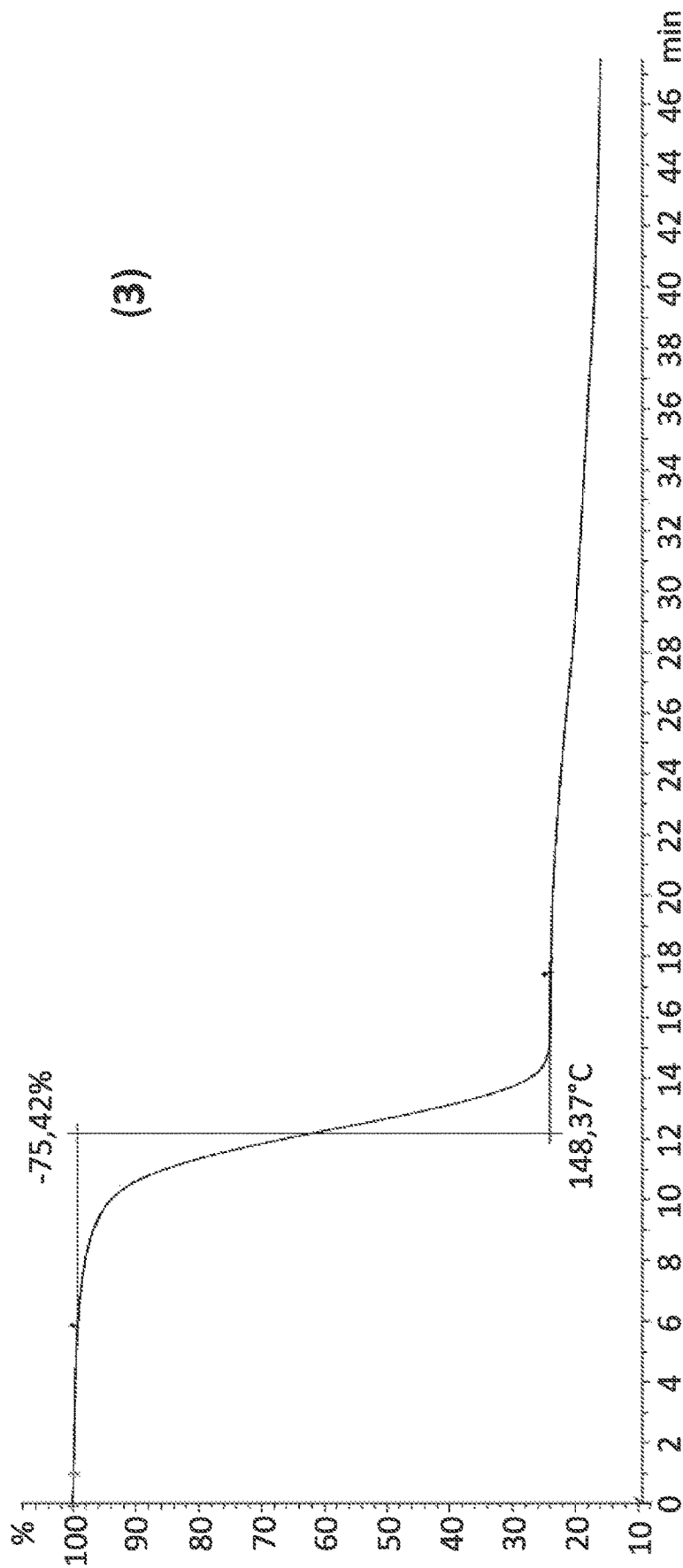

NMR of 3 in solution: $^1$H(CDCl$_3$): δ (ppm) 1.24 (s, CH$_3$), 2.50 (wide s, CH$_2$), 2.63 (wide s, N H). $^{13}$C{$^1$H}(CDCl$_3$): δ (ppm) 13.3 (s, CH$_3$), 46.3 (s, CH$_2$), $^{11}$B{$^1$H}(CDCl$_3$): δ (ppm) −7.0. Solid state NMR $^{13}$C{$^1$H} CPMAS of 3 (303.0 K; 150.94 MHz; $\nu_{rotor}$=7 KHz): δ (ppm) 44.7, 13.6 IR analysis of 3: $\nu_{N-H}$≈3250 cm$^{-1}$; $\nu_{C-H}$≈2950 cm'; $\nu_{B-H}$≈2300 cm$^{-1}$. ATG analysis of 3: level 1: −75.42% or −4.28 mg, residue 23.78% or 1.35 mg, inflection point 151.65° C., central point 148.37° C. (see FIG. 4).

Preparation of Polypropylaminoborane [nPrNH—BH$_2$]$_n$ (4)

| Protocol A | | | | | | | |
|---|---|---|---|---|---|---|---|
| DIAB Q1 (mL) | A (nPrNH$_2$) (mL) | T1 (° C.) | t1 (min) | t2 (h) | S | V1 (mL) | Yield g (%) |
| 3 | 1.6 | −70 | 60 | 19 | Et$_2$O | 3 × 15 | 0.7720 g (59%) |

Elemental Analysis of 4:

| Element | Theoretical | Experimental |
|---|---|---|
| C | 50.80 | 50.10 |
| H | 14.21 | 14.10 |
| N | 19.75 | 19.43 |

GPC analysis of 4: (THF 0.1% w/w n-Bu$_4$NBr); 1 mg/mL; after 1 day under stirring and subsequent filtration:

| Start RT (min) | Mn | Mw | Mz | Mp | PD |
|---|---|---|---|---|---|
| 6.58 | 100000 | 351000 | 1480000 | 123000 | 3.51 |
| 8.85 | 1040 | 1350 | 1810 | 1020 | 1.31 |

NMR of 4 in solution: $^1$H (CDCl$_3$): δ (ppm) 0.89 (t, CH$_3$), 1.63 and 1.77 (wide s, CH$_2$), 2.36 and 2.47 (wide s, CH$_2$—N), 2.71 (s wide, NH); $^{13}$C{$^1$H} (CDCl$_3$): δ (ppm) 52.6 (CH$_2$—N), 21.2 (CH$_2$), 11.8 (s, CH$_3$); $^{11}$B{$^1$H} (CDCl$_3$): δ (ppm) −7.4. Solid state NMR: $^{13}$C{$^1$H} CPMAS (303.0 K; 150.94 MHz; ν$_{rotor}$=7 KHz): δ (ppm) 50.79, 20.70, 11.26. IR analysis of 4: ν$_{N-H}$≈3250 cm$^{-1}$; ν$_{C-H}$≈2950 cm$^{-1}$; ν$_{B-H}$≈2300 cm$^{-1}$. ATG analysis of 4: level 1: −44.65% or −2.72 mg, residue 54.60% or 3.33 mg, inflection point 145.06° C., central point 140.46° C.; level 2: −21.67% or −1.32 mg, residue 32.89% or 2.01 mg, inflection point 461.19° C., central point 414.99° C.

Preparation of Polybutylaminoborane [nBuNH—BH$_2$]$_n$ (5)

| Protocol A | | | | | | | |
|---|---|---|---|---|---|---|---|
| DIAB Q1 (mL) | A (nBuNH$_2$) Q2 (mL) | T1 (° C.) | t1 (min) | t2 (h) | S | V1 (mL) | Yield g (%) |
| 3 | 1.9 | −50 | 60 | 19 | MeCN | 3 × 15 | 1.2316 (78%) |

Elemental Analysis of 5:

| Element | Theoretical | Experimental |
|---|---|---|
| C | 56.55 | 54.75 |
| H | 14.24 | 14.05 |
| N | 16.49 | 16.20 |

GPC analysis of 5: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 5.72 | 517000 | 2990000 | 17200000 | 1440000 | 5.78 |
| 8.83 | 1190 | 1290 | 1430 | 1060 | 1.08 |

NMR of 5 in solution: $^1$H (CDCl$_3$): δ (ppm) 0.92 (t, CH$_3$), 1.31 (wide s, CH$_2$), 1.57 and 1.76 (wide s, CH$_2$), 2.37 and 2.52 (wide s, CH$_2$—N), 2.69 (wide s, NH); $^{13}$C{$^1$H} (CDCl$_3$): δ (ppm) 50.8 (CH$_2$—N), 30.2 (s CH$_2$), 20.85 (s CH$_2$), 14.05 (s CH$_3$); $^{11}$B{$^1$H} (CDCl$_3$): δ (ppm) −7.6. Solid state NMR of 5: $^{13}$C{$^1$H} CPMAS (303.0 K; 150.94 MHz; ν$_{rotor}$=7 KHz): δ (ppm) 49.64, 29.75, 20.20, 13.50. IR analysis of 5: ν$_{N-H}$≈3250 cm$^{-1}$; ν$_{C-H}$≈2950 cm$^{-1}$; ν$_{B-H}$≈2300 cm$^{-1}$. ATG analysis of 5: level 1: −31.65% or −1.73 mg, residue 64.99% or 3.54 mg, inflection point 152.35° C., central point 151.86° C.; level 2: −23.00% or −1.25 mg, residue 42.01% or 2.29 mg, inflection point 496.06° C., central point 454.49° C.

Preparation of Polyallylaminoborane [AllNH—BH$_2$]$_n$ (6)

| Protocol A | | | | | | | |
|---|---|---|---|---|---|---|---|
| DIAB Q1 (mL) | A (AllNH$_2$) Q2 (mL) | T1 (° C.) | t1 (min) | t2 (h) | S | V1 (mL) | Yield g (%) |
| 3 | 1.4 | −50 | 60 | 19 | MeCN | 3 × 15 | 0.6162 (48%) |

Elemental Analysis of 6:

| Element | Theoretical | Experimental |
|---|---|---|
| C | 52.29 | 43.08 |
| H | 11.70 | 10.27 |
| N | 20.33 | 16.28 |

GPC analysis of 6: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 6.58 | 161000 | 389000 | 1120000 | 121000 | 2.42 |
| 8.57 | 2330 | 2440 | 2560 | 2060 | 1.05 |
| 8.97 | 811 | 865 | 929 | 748 | 1.07 |

NMR of 6 in solution: $^1$H(CDCl$_3$): δ (ppm) 6.08 (m), 5.29 (d), 5.19 (d) (CO, 3.12 (wide s, CH$_2$), 2.98 (wide s, NH); $^{13}$C{$^1$H} (CDCl$_3$): δ (ppm) 134.08 (s), 119.47 (s), 53.38 (s); $^{11}$B{$^1$H} (CDCl$_3$): δ (ppm) −7.3. Solid state NMR of 6: $^{13}$C{$^1$H} CPMAS (303.0 K; 75.48 MHz; ν$_{rotor}$=7 KHz): δ (ppm) 160.97, 151.15, 130.55, 115.09, 48.25. IR analysis of 6: ν$_{N-H}$≈3250 cm$^{-1}$; ν$_{C-H}$≈2950 cm$^{-1}$; ν$_{B-H}$≈2300 cm$^{-1}$. ATG analysis of 6: level 1: −7.83% or −0.46 mg, residue 91.21% or 5.34 mg, inflection point 118.05° C., central point 114.07° C.; level 2: −8.89% or −0.52 mg, residue 82.19% or 4.81 mg, inflection point 163.87° C., central point 169.27° C.; level 3: −48.07% or −2.81 mg, residue 34.07% or 1.99 mg, inflection point 297.69° C., central point 297.27° C.

Preparation of Polybutylaminoborane/Polyethylaminoborane Copolymer [nBuNH—BH$_2$]$_n$[EtNH—BH$_2$]$_n$ (7)

Protocol A

| DIAB Q1 (mL) | A (nBuNH$_2$/ EtNH$_2$) Q2 (mL) | T1 (° C.) | t1 (min) | t2 (h) | S | V1 (mL) | Yield g (%) |
|---|---|---|---|---|---|---|---|
| 3 | 0.9/0.6 | −70 | 60 | 19 | MeCN | 3 × 15 | 0.8462 (64%) |

Elemental Analysis of 7:

| Element | Theoretical | Experimental |
|---|---|---|
| C | 50.80 | 48.68 |
| H | 14.21 | 13.73 |
| N | 19.75 | 19.12 |

GPC analysis of 7: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 5.98 | 268000 | 1040000 | 4060000 | 609000 | 3.86 |
| 8.90 | 930 | 1040 | 1180 | 897 | 1.11 |

Figure 5:
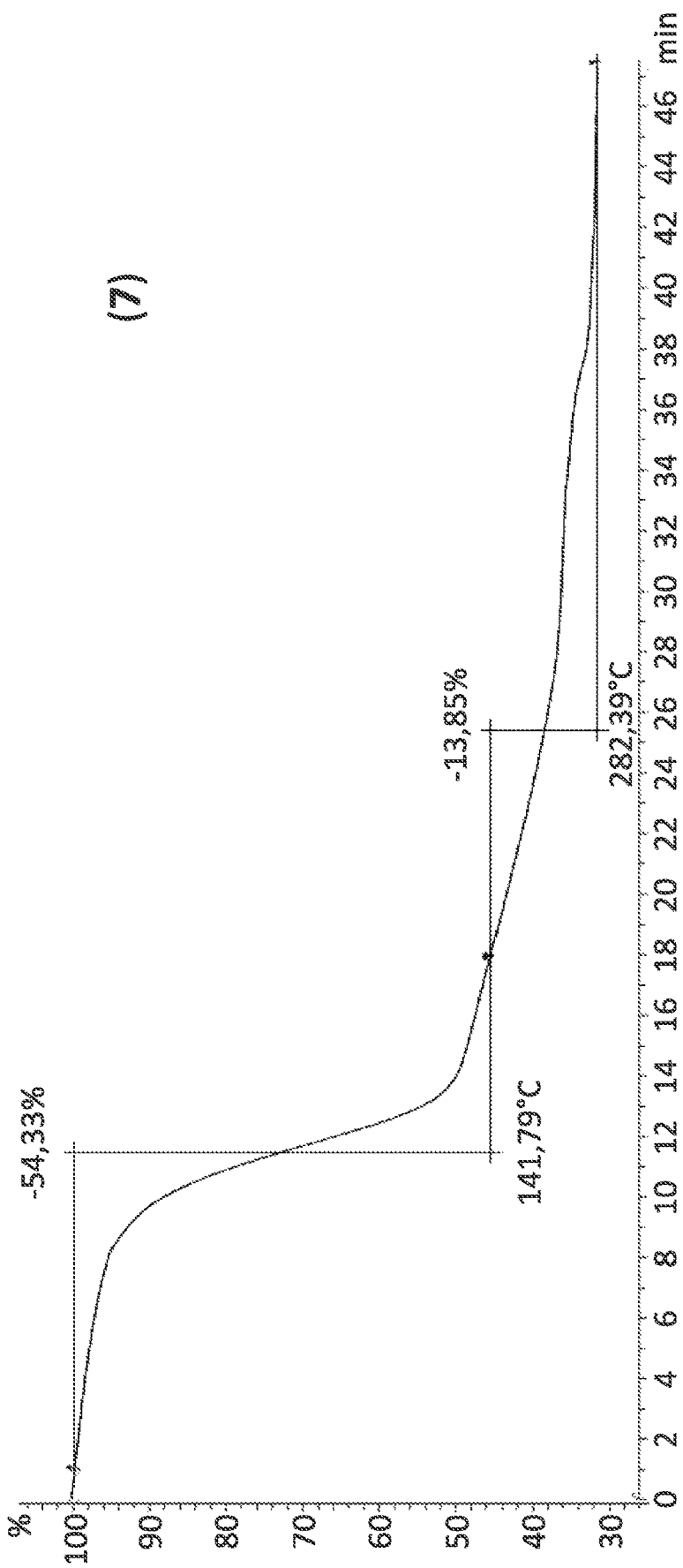

NMR of 7 in solution: $^1$H (CDCl$_3$): δ (ppm) 0.92 (t, CH$_3$ Bu), 1.23 (wide s, CH$_3$ Et), 1.30 (wide m, CH$_2$ Bu), 1.77 and 1.57 (wide s, CH$_2$ Bu), 2.38 and 2.47 (wide s, CH$_2$ Bu), 2.54 and 2.63 (wide s, CH$_2$ Et); $^{13}$C{$^1$H} (CDCl$_3$): δ (ppm) 50.91 (s, CH$_2$—N, Bu), 45.23 (s, CH$_2$—N Et), 30.22 and 20.84 (s, CH$_2$ Bu), 14.07 (s, CH$_3$ Bu), 13.33 (s, CH$_3$ Et); $^{11}$B{$^1$H} (CDCl$_3$): δ (ppm) −7.4. Solid state NMR of 7: $^{13}$C{$^1$H} CPMAS (303.0 K; 150.94 MHz; $\nu_{rotor}$=7 KHz): δ (ppm) 49.23, 44.43, 29.90, 20.35, 13.53. IR analysis of 7: $\nu_{N-H}$≈3250 cm$^{-1}$; $\nu_{C-H}$≈2950 cm$^{-1}$; $\nu_{B-H}$≈2300 cm$^{-1}$. ATG analysis of 7: level 1: −54.33% or −2.64 mg, residue 45.38% or 2.20 mg, inflection point 144.35° C., central point 141.79° C.; level 2: −13.85% or −0.67 mg, residue 34.49% or 1.53 mg, inflection point 220.81° C., central point 282.39° C. (see FIG. 5).

Preparation of Polybutylaminoborane/Polyethylaminoborane Copolymer [nBuNH—BH$_2$]$_{2n}$[EtNH—BH$_2$]$_n$ (8)

Protocol A

| DIAB Q1 (mL) | A (nBuNH$_2$/ EtNH$_2$) Q2 (mL) | T1 (° C.) | t1 (min) | t2 (h) | S | V1 (mL) | Yield g (%) |
|---|---|---|---|---|---|---|---|
| 3 | 1.2/0.4 | −65 | 60 | 19 | MeCN | 2 × 15 | 0.2782 (23.5%) |

Elemental Analysis of 8:

| Element | Theoretical | Experimental |
|---|---|---|
| C | 52.95 | 51.48 |
| H | 14.22 | 13.98 |
| N | 18.53 | 18.99 |

GPC analysis of 8: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 6.08 | 257000 | 705000 | 2070000 | 466000 | 2.74 |
| 8.92 | 926 | 1070 | 1310 | 830 | 1.16 |

Solid state NMR of 8: $^{13}$C{$^1$H} CPMAS (303.0 K; 150.94 MHz; $\nu_{rotor}$=7 KHz): δ (ppm) 49.97, 44.01, 29.59, 20.32, 13.51. IR analysis of 8: $\nu_{N-H}$≈3250 cm$^{-1}$; $\nu_{C-H}$≈2950 cm$^{-1}$; $\nu_{B-H}$≈2300 cm$^{-1}$. ATG analysis of 8: level 1: −28.25% or −1.29 mg, residue 70.53% or 3.23 mg, inflection point 144.84° C., central point 137.56° C.; level 2: −13.84% or −0.63 mg, residue 56.61% or 2.59 mg, inflection point 187.14° C., central point 198.39° C.; level 3: −21.45% or −0.98 mg, residue 35.00% or 1.60 mg, inflection point 451.20° C., central point 414.18° C.

Preparation of Polypropylaminoborane/Polyethylaminoborane Copolymer [nPrNH—BH$_2$]$_n$[EtNH—BH$_2$]$_n$ (9)

Protocol A

| DIAB Q1 (mL) | A (nPrNH$_2$/ EtNH$_2$) Q2 (mL) | T1 (° C.) | t1 (min) | t2 (h) | S | V1 (mL) | Yield g (%) |
|---|---|---|---|---|---|---|---|
| 3 | 0.8/0.6 | −60 | 60 | 19 | MeCN | 3 × 15 | 0.4122 (35%) |

Elemental Analysis of 9:

| Element | Theoretical | Experimental |
|---|---|---|
| C | 46.98 | 41.54 |
| H | 14.19 | 12.97 |
| N | 21.91 | 19.50 |

GPC analysis of 9: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 6.65 | 24700 | 68600 | 128000 | 103000 | 2.78 |
| 8.88 | 965 | 1100 | 1250 | 914 | 1.14 |

Figure 6:
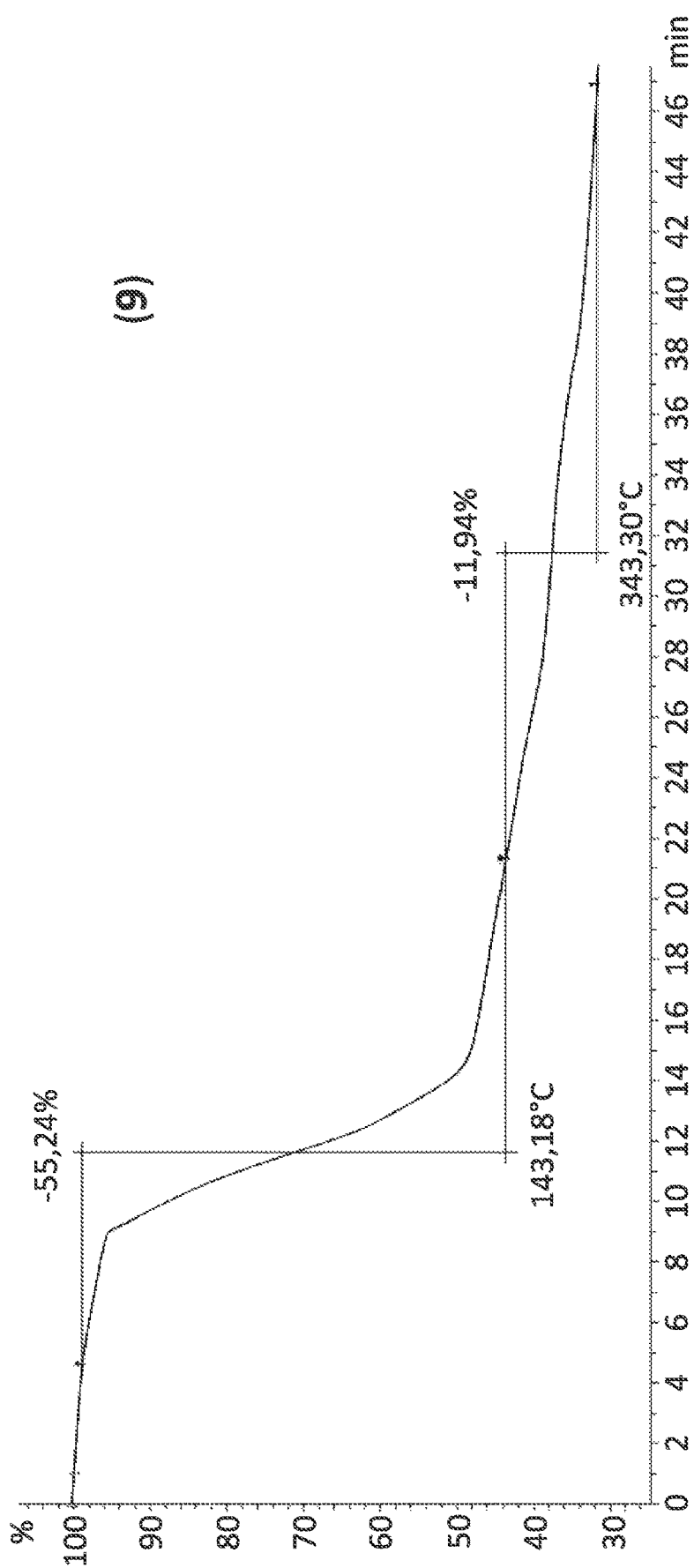

Solid state NMR of 9: $^{13}$C{$^1$H} CPMAS (303.0 K; 150.94 MHz; $\nu_{rotor}$=7 KHz): δ (ppm) 50.18, 44.09, 21.34, 13.28, 11.61. IR analysis of 9: $\nu_{N-H}$≈3250 cm$^{-1}$; $\nu_{C-H}$≈2950 cm$^{-1}$; $\nu_{B-H}$≈2300 cm$^{-1}$. ATG analysis of 9: level 1: −55.24% or −3.25 mg, residue 43.40% or 2.56 mg, inflection point 143.76° C., central point 143.18° C.; level 2: −11.94% or −0.70 mg, residue 31.46% or 1.85 mg, inflection point 297.75° C., central point 343.30° C. (see FIG. 6).

Preparation of Polypropylaminoborane/Polyethylaminoborane Copolymer [nPrNH—BH$_2$]$_{2n}$[EtNH—BH$_2$]$_n$ (10)

Protocol B

| DIAB Q1 (mL) | A (nPrNH$_2$/ EtNH$_2$) Q2 (mL) | T1 (° C.) | t1 (min) | t2 (h) | S | V1 (mL) | Yield g (%) |
|---|---|---|---|---|---|---|---|
| 3 | 1.02/0.4 | −50 | 60 | 19 | MeCN | 3 × 15 | 0.7480 (61%) |

Elemental Analysis of 10:

| Element | Theoretical | Experimental |
|---|---|---|
| C | 48.34 | 44.20 |
| H | 14.20 | 13.53 |
| N | 21.14 | 19.52 |

GPC analysis of 10: (THF 0.1% w/w n-Bu$_4$NBr); 1 mg/mL; after 1 day under stirring and subsequent filtration:

| Start RT (min) | Mn | Mw | Mz | Mp | PDI |
|---|---|---|---|---|---|
| 6.52 | 185000 | 1030000 | 4180000 | 141000 | 5.57 |
| 8.88 | 945 | 1100 | 1310 | 923 | 1.16 |

NMR of 10 in solution: $^1$H NMR (CDCl$_3$): δ (ppm) 0.90 (t, CH$_3$ Pr), 1.23 (wide s, CH$_3$ Et), 1.79 and 1.62 (wide s, CH$_2$ Pr), 2.47 and 2.36 (wide s, CH$_2$—N Pr), 2.66 (wide s, CH$_2$—N Et); $^{13}$C{$^1$H} (CDCl$_3$): δ (ppm) 52.71 (CH$_2$—N Pr), 45.18 (CH$_2$—N Et), 21.16 (CH$_2$ Pr), 13.26 (CH$_3$ Et), 11.83 (CH$_3$ Pr);); $^{11}$B{$^1$H} (CDCl$_3$): δ (ppm) −6.8. Solid state NMR of 10: $^{13}$C{$^1$H} CPMAS (303.0 K; 150.94 MHz; ν$_{rotor}$=7 KHz): δ (ppm) 50.8, 43.0, 20.6, 11.6.18 analysis of 10: ν$_{N-H}$≈3250 cm$^{-1}$; ν$_{C-H}$≈2950 cm$^{-1}$; ν$_{B-H}$≈2300 cm$^{-1}$. ATG analysis of 10: level 1: −54.88% or −2.70 mg, residue 43.71% or 2.15 mg, inflection point 147.90° C., central point 144.19° C.; level 2: −16.11% or −0.79 mg, residue 27.60% or 1.36 mg, inflection point 269.12° C., central point 306.76° C.

Figure 7:
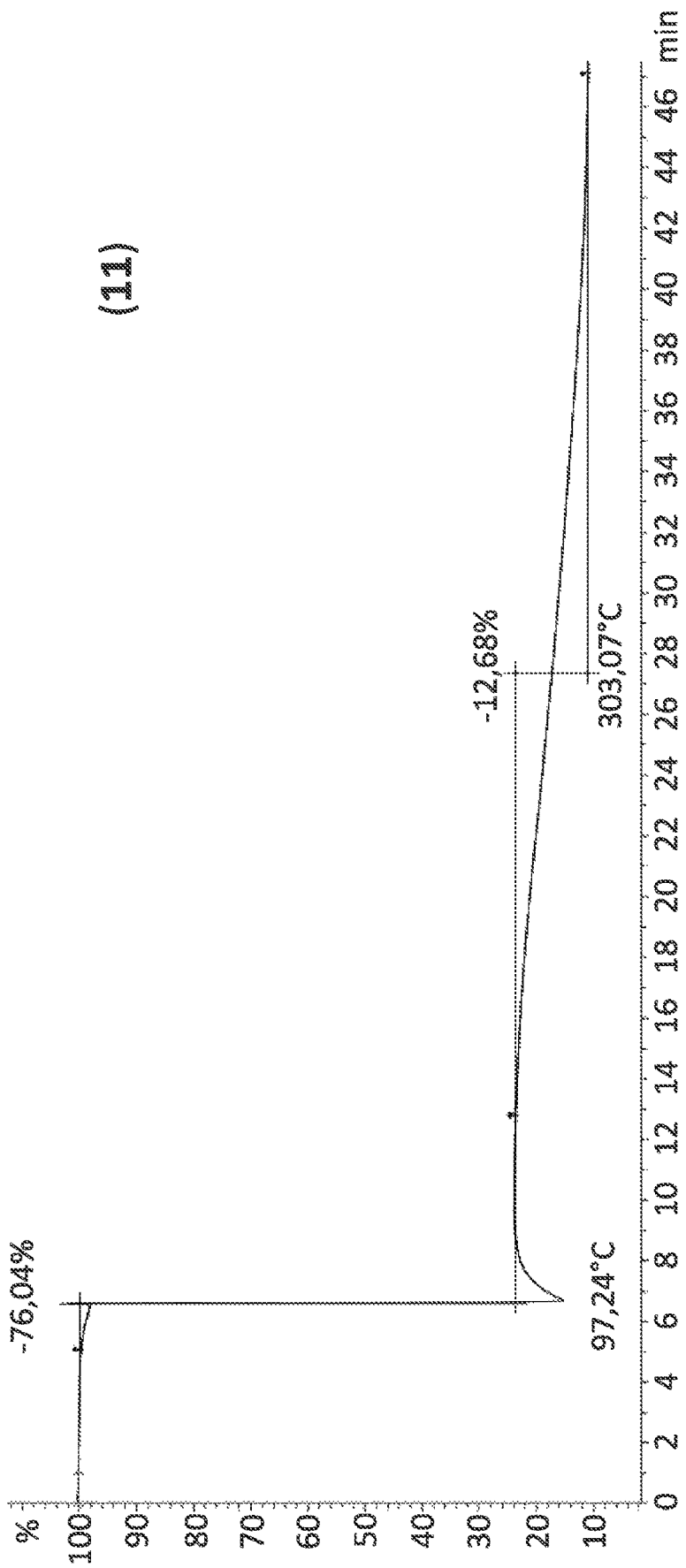

The preparation of propargylaminoborane [PropargylNH—BH$_2$]$_{2n}$ (11): 11 can be prepared according to general protocol A or B, for example as defined above for the preparation of polymers 1 to 6. ATG analysis of 11: level 1: −76.04% or −4.51 mg, residue 23.46% or 1.39 mg, inflection point 97.21° C., central point 97.24° C.; level 2: −12.68% or −0.75 mg, residue 10.78% or 0.64 mg, inflection point 238.20° C., central point 303.07° C. (see FIG. 7).

A value of the number of repeating units n as defined in Table 1 below, can be estimated by dividing the mass average molecular weight Mw obtained by GPC, by the molecular weight M of the monomer.

TABLE 1

| | M$_{monomer}$ (g · mol$^{-1}$) | n (polymer) | n (oligomers 1) | n (oligomers 2) |
|---|---|---|---|---|
| (MeNHBH$_2$)$_n$ (2) | 42.88 | 4620 | 32 | — |
| (EtNHBH$_2$)$_n$ (3) | 56.90 | 3831 | 22 | — |
| (PrNHBH$_2$)$_n$ (4) | 70.93 | 4949 | 19 | — |

TABLE 1-continued

| | M$_{monomer}$ (g · mol$^{-1}$) | n (polymer) | n (oligomers 1) | n (oligomers 2) |
|---|---|---|---|---|
| (BuNHBH$_2$)$_n$ (5) | 84.96 | 35193 | 15 | — |
| (AllNHBH$_2$)$_n$ (6) | 68.91 | 5645 | 35 | 12 |

For copolymers, a value of the number of repeating units n can also be estimated (see Table 2 below). The copolymer is considered to be a polymer consisting of a fictitious monomer whose molecular weight $\overline{M}$ is the average of the molar mass of the monomers of which it is composed and which depends on the molar ratio of the reagents used, assuming that they react identically.

TABLE 2

| | $\overline{M}_{monomer}$ (g · mol$^{-1}$) | n (polymer) | n (oligomers) |
|---|---|---|---|
| (nBuNH—BH$_2$)$_{n/2}$ (EtNH—BH$_2$)$_{n/2}$ (7) | 70.93 | 14662 | 15 |
| (nBuNH—BH$_2$)$_{2n/3}$ (EtNH—BH$_2$)$_{n/3}$ (8) | 75.61 | 9324 | 14 |
| (nPrNH—BH$_2$)$_{n/2}$ (EtNH—BH$_2$)$_{n/2}$ (9) | 63.915 | 1073 | 17 |
| (nPrNH—BH$_2$)$_{2n/3}$ (EtNH—BH$_2$)$_{n/3}$ (10) | 66.253 | 15546 | 17 |

Although the above-mentioned embodiments and examples are described in detail, it is understood that additional embodiments may be considered. For example, polyaminoboranes as described herein may be prepared from aminoboranes other than diisopropylaminoborane and/or from amines other than ammonia and primary amines of methyl, ethyl, n-propyl, n-butyl, allyl and propargyl. Indeed, since aminoborane is more sterically hindered than monomer by the secondary amino group, the polymerization reaction can be carried out by means of a wide range of aminoboranes, primary amines and hydrazines. Also, polyaminoboranes according to the present description can be prepared using reaction conditions other than those described in detail in the examples. For example, polyaminoboranes can be obtained using quantities of reagents, molar ratios, temperatures and durations other than those indicated in the examples. In addition, unless otherwise specified in the present description, it will be apparent to the skilled person that all the processes described above may be combined with each other. For example, unless otherwise specified, all the characteristics of the embodiments described above may be combined with or replaced by other characteristics of other embodiments.

The invention claimed is:
1. A polyaminoborane comprising at least one repeating unit of formula R$^5$NH—BR$^3$R$^4$, wherein R$^3$ and R$^4$ are the same or different and are selected from the group consisting of a hydrogen atom, a substituted or unsubstituted heteroatom and a linear, branched, cyclic or cyclic and branched organic group having from 1 to 30 carbon atoms; or R$^3$ and R$^4$ together form a cyclic or cyclic and branched organic group having from 3 to 30 carbon atoms; wherein R$^5$ is selected from the group consisting of a hydrogen atom, a substituted or unsubstituted nitrogen atom and a linear, branched, cyclic or cyclic and branched organic group having from 1 to 30 carbon atoms;
wherein if R$^5$ is a hydrogen atom or a methyl group, at least one of R$^3$ and R$^4$ is not a hydrogen atom; and wherein if $R^5$ is a n-butyl group, at least one of $R^3$ and $R^4$ is not a hydrogen atom, or the polyaminoborane has a mass average molecular weight greater than or equal to 500,000; and wherein the polyaminoborane has at least one of the following formulas:

$[R^5NH—BR^3R^4]_n$, wherein n is a number greater than 10; and $[R^5NH—BR^3R^4]_m[R^6NH—BR^3R^4]_{(n-m)}$, wherein n is a number greater than 10 and m is a number greater than or equal to 10 and less than n; wherein $R^6$ is different from $R^5$ and $R^6$ is selected from the group consisting of a hydrogen atom, a substituted or unsubstituted nitrogen atom and a linear, branched, cyclic or cyclic and branched organic group having from 1 to 30 carbon atoms; and wherein if $R^5$ is methyl, at least one of $R^3$ and $R^4$ is not a hydrogen atom, or $R^6$ is not a hydrogen atom or a n-butyl group; and wherein at least one of $R^3$ and $R^4$ is a hydrogen atom.

2. The polyaminoborane according to claim 1, wherein at least one of $R^5$ and $R^6$ is selected from the group consisting of a hydrogen atom, a substituted or unsubstituted nitrogen atom, methyl, ethyl, n-propyl, n-butyl, substituted or unsubstituted allyl, a substituted or unsubstituted propargyl and a linear, branched, cyclic or cyclic and branched organic group having from 3 to 24 carbon atoms and substituted with at least one alkene, alkyne, ether, thioether, secondary amine, phosphine and/or silyl group.

3. A ceramic precursor or ceramic comprising a polyaminoborane comprising at least one repeating unit of formula $R^5NH—BR^3R^4$, wherein $R^3$ and $R^4$ are the same or different and are selected from the group consisting of a hydrogen atom, a substituted or unsubstituted heteroatom and a linear, branched, cyclic or cyclic and branched organic group having from 1 to 30 carbon atoms; or $R^3$ and $R^4$ together form a cyclic or cyclic and branched organic group having from 3 to 30 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms wherein if $R^5$ is a dydrogen atom or a methyl group, at least one of $R^3$ and $R^4$ is not a hydrogen atom; and wherein if $R^5$ is a n-butyl group, at least one of $R^3$ and $R^4$ is not a hydrogen atom, or the polyaminoborane has a mass average molecular weight greater than or equal to 500,000; and wherein the polyaminoborane has at least one of the following formulas:

$]R^5NH—BR^3R^4]_n$, wherein n is a number greater than 10; and $]R^5NH—BR^3R^4]_m[R^6NH—BR^3R^4]_{(n-m)}$, wherein n is a number greater than 10 and m is a number greater than or equal to 10 and less than n; wherein $R^6$ is different from $R^5$ and $R^6$ is selected from the group consisting of a hydrogen atom, a substituted or unsubstituted nitrogen atom and a linear, branched, byclic or cyclic and branched organic group having from 1 to 30 carbon atoms; and wherein if $R^5$ is methyl, at least one of $R^3$ and $R^4$ is not a hydrogen atom, or $R^6$ is not a hydrogen atom or a n-butyl group.

4. A hydrogen fuel cell or energy material comprising a polyaminoborane comprising at least one repeating unit of formula $R^5NH—BR^3R^4$, wherein $R^3$ and $R^4$ are the same or different and are selected from the group consisting of a hydrogen atom, a substituted or unsubstituted heteroatom and a linear, branched, cyclic or cyclic and branched organic group having from 1 to 30 carbon atoms; or $R^3$ and $R^4$ together form a cyclic or cyclic and branched organic group having from 3 to 30 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms wherein if $R^5$ is a hydrogen atom or a methyl group, at least one of $R^3$ and $R^4$ is not a hydrogen atom; and wherein if $R^5$ is a n-butyl group, at least one of $R^3$ and $R^4$ is not a hydrogen atom, or the polyaminoborane has a mass average molecular weight greater than or equal to 500,000; and wherein the polyaminoborane has at least one of the following formulas:

$[R^5NH—BR^3R^4]_n$, wherein n is a number greter than 10; and $[R^5NH—BR^3R^4]_m[R^6NH—BR^3R^4]_{(n-m)}$, wherein n is a number greater than 10 and m is a number greater than or equal to 10 and less than n; wherein $R^6$ is different from $R^5$ and $R^6$ is selected from the group consisting of a hydrogen atom, a substituted or unsubstituted nitrogen atom and a linear, branched, cyclic or cyclic and branched organic group having from 1 to 30 carbon atoms; and wherein if $R^5$ is methyl, at least one of $R^3$ and $R^4$ is not a hydrogen atom, or $R^6$ is not a hydrogen atom or a n-butyl group.

5. The polyaminoborane of claim 1, wherein at least one of $R^5$ and $R^6$ is selected from the group consisting of a hydrogen atom, a substituted or unsubstituted nitrogen atom, methyl, ethyl, n-propyl, n-butyl, substituted or unsubstituted allyl, a substituted or unsubstituted propargyl and a linear, branched, cyclic or cyclic and branched organic group having from 3 to 24 carbon atoms and substituted with at least one alkene, alkyne, ether, thioether, secondary amine, phosphine and/or silyl group.

6. A method comprising:
preparing a ceramic precursor or a ceramic, or
preparing boron nitride, or
storing and/or producing dihydrogen,
from a polyaminoborane comprising at least one repeating unit of formula $R^5NH—BR^3R^4$, wherein $R^3$ and $R^4$ are the same or different and are selected from the group consisting of a hydrogen atom, a substituted or unsubstituted heteroatom and a linear, branched, cyclic or cyclic and branched organic group having from 1 to 30 carbon atoms; or $R^3$ and $R^4$ together form a cyclic or cyclic and branched organic group having from 3 to 30 carbon atoms; wherein $R^5$ is selected from the group consisting of a hydrogen atom, a substituted or unsubstituted nitrogen atom and a linear, branched, cyclic or cyclic and branched organic group having from 1 to 30 carbon atoms wherein if $R^5$ is a hydrogen atom or a methyl group, at least one of $R^3$ and $R^4$ is not a hydrogen atom; and wherein if $R^5$ is a n-butyl group, at least one of $R^3$ and $R^4$ is not a hydrogen atom, or the polyaminoborane has a mass average molecular weight greater than or equal to 500,000; and wherein the polyaminoborane has at least one of the following formulas:

$[R^5NH—BR^3R^4]_n$, wherein n is a number greater than 10; and $[R^5NH—BR^3R^4]_m[R^{6NH—BR3}R^4]_{(n-m)}$, wherein n is a number greater than 10 and m is a number greater than or equal to 10 and less than n; wherein $R^6$ is different from $R^5$ and $R^6$ is selected from the group consisting of a hydrogen atom, a substituted or unsubstituted nitrogen atom and a linear, branched, cyclic or cyclic and branched organic group having from 1 to 30 carbon atoms; and wherein if $R^5$ is methyl, at least one of $R^3$ and $R^4$ is not a hydrogen atom, or $R^6$ is not a hydrogen atom or a n-butyl group.

\* \* \* \* \*